(12) United States Patent
Mitevski et al.

(10) Patent No.: US 12,243,092 B2
(45) Date of Patent: *Mar. 4, 2025

(54) INVENTORY MANAGEMENT SYSTEM PROTECTION FOR NETWORK TRAFFIC SURGE RESISTANT PLATFORM

(71) Applicant: Fevo, Inc., New York, NY (US)

(72) Inventors: Vladimir Mitevski, New York, NY (US); Ari Daie, New York, NY (US)

(73) Assignee: Fevo, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/071,003

(22) Filed: Nov. 29, 2022

(65) Prior Publication Data

US 2024/0020752 A1    Jan. 18, 2024

Related U.S. Application Data

(63) Continuation-in-part of application No. 17/865,906, filed on Jul. 15, 2022, and a continuation-in-part of
(Continued)

(51) Int. Cl.
*G06Q 30/00* (2023.01)
*G06Q 10/087* (2023.01)
(Continued)

(52) U.S. Cl.
CPC ....... *G06Q 30/0637* (2013.01); *G06Q 10/087* (2013.01); *G06Q 30/0222* (2013.01)

(58) Field of Classification Search
None
See application file for complete search history.

(56) References Cited

U.S. PATENT DOCUMENTS

| 7,949,572 B2 | 5/2011 | Perrochon |
| 8,015,071 B2 | 9/2011 | Crespo |

(Continued)

FOREIGN PATENT DOCUMENTS

| CA | 2325153 | 5/2002 |
| WO | WO2023278415 | 1/2023 |

OTHER PUBLICATIONS

Lim, Weng Marc. "Online Group Buying: Some Insights from the Business-to-Business Perspective." Industrial Marketing Management, 2017. (Year: 2017).*

(Continued)

*Primary Examiner* — Luis A Brown
(74) *Attorney, Agent, or Firm* — McDonald Hopkins LLC; James P. Muraff

(57) ABSTRACT

Management of surge network traffic to an electronic commerce platform is described herein. A network traffic surge resistant system includes network storage and one or more servers configured as a commerce platform. The commerce platform operates an adaptor between the commerce platform and an inventory management system. The adaptor protects the inventory management system from transactions generated by a surge of network traffic directed at the commerce platform. The commerce platform generates a script, an offer package, and an offer instantiator based on inventory information received by the adaptor. The commerce platform stores the script and the offer package onto the network storage. The offer instantiator provides the location of the script and the offer package in the network.

20 Claims, 8 Drawing Sheets

Related U.S. Application Data application No. 17/865,933, filed on Jul. 15, 2022, and a continuation-in-part of application No. 17/865,951, filed on Jul. 15, 2022, and a continuation-in-part of application No. 17/865,893, filed on Jul. 15, 2022, now Pat. No. 11,830,061, and a continuation-in-part of application No. 17/865,989, filed on Jul. 15, 2022, now Pat. No. 11,636,512.

(51) Int. Cl.
*G06Q 30/0207* (2023.01)
*G06Q 30/0601* (2023.01)

(56) References Cited

U.S. PATENT DOCUMENTS

| | | |
|---|---|---|
| 9,406,092 B2 | 8/2016 | Adams |
| 9,734,530 B2 | 8/2017 | Killoran |
| 9,760,936 B1 | 9/2017 | Shaw |
| 9,990,660 B2 | 6/2018 | Gao |
| 10,002,337 B2 | 6/2018 | Siddique |
| 10,043,142 B2 | 8/2018 | Paleja |
| 10,846,691 B1* | 11/2020 | Girdhar .................. G06Q 20/12 |
| 11,288,697 B1* | 3/2022 | Sampey ................. G06Q 20/204 |
| 11,310,333 B2* | 4/2022 | Lepeska .............. H04L 67/5681 |
| 11,429,966 B1* | 8/2022 | Adam .................. G06Q 20/385 |
| 2002/0069108 A1 | 6/2002 | Aubertin |
| 2003/0105672 A1* | 6/2003 | Epstein .................. G06Q 20/04 |
| | | 705/17 |
| 2005/0177442 A1* | 8/2005 | Sullivan ............... G06Q 10/087 |
| | | 705/16 |
| 2008/0114650 A1* | 5/2008 | Ku ...................... G06Q 30/0213 |
| | | 705/14.23 |
| 2008/0114654 A1* | 5/2008 | McGrath ............ G06Q 30/0603 |
| | | 705/14.39 |
| 2009/0254447 A1 | 10/2009 | Blades |
| 2009/0327129 A1 | 12/2009 | Collas |
| 2011/0137706 A1* | 6/2011 | Howard ............. G06Q 30/0246 |
| | | 705/7.29 |
| 2011/0173095 A1* | 7/2011 | Kassaei .................. G06Q 30/02 |
| | | 705/26.7 |
| 2011/0184834 A1 | 7/2011 | Perrochon |
| 2011/0196853 A1 | 8/2011 | Bigham |
| 2011/0238497 A1 | 9/2011 | Milne |
| 2012/0185355 A1 | 7/2012 | Kilroy |
| 2012/0226614 A1 | 9/2012 | Gura |
| 2012/0233020 A1 | 9/2012 | Eberstadt |
| 2013/0046679 A1 | 2/2013 | Davoust |
| 2013/0092731 A1* | 4/2013 | Pettersson .............. G06K 19/14 |
| | | 235/375 |
| 2013/0124287 A1* | 5/2013 | Bjorn ................. G06Q 30/0222 |
| | | 705/14.23 |
| 2013/0138496 A1* | 5/2013 | Jin ......................... G06Q 30/02 |
| | | 705/14.26 |
| 2013/0151323 A1* | 6/2013 | Shepard ............. G06Q 30/0222 |
| | | 705/14.23 |
| 2013/0191251 A1 | 7/2013 | Martin |
| 2014/0052617 A1 | 2/2014 | Chawla |
| 2014/0074584 A1* | 3/2014 | Fisher ................. G06Q 30/0207 |
| | | 705/14.39 |
| 2014/0081798 A1 | 3/2014 | Millstone-Shroff |
| 2014/0257955 A1* | 9/2014 | Powell ................... G06Q 30/06 |
| | | 705/14.23 |
| 2015/0032626 A1 | 1/2015 | Dill |
| 2015/0248664 A1* | 9/2015 | Makhdumi ........ G06Q 20/3274 |
| | | 235/380 |
| 2015/0269624 A1* | 9/2015 | Cheng ................. G06Q 30/0261 |
| | | 705/14.58 |
| 2015/0295920 A1* | 10/2015 | Van Kerrebroeck ... G06F 21/44 |
| | | 726/9 |
| 2016/0042388 A1* | 2/2016 | Chater .................. H04L 67/535 |
| | | 705/14.45 |
| 2016/0379194 A1 | 12/2016 | Dvir |
| 2017/0134385 A1* | 5/2017 | Mitevski ............... H04L 67/141 |
| 2017/0300960 A1* | 10/2017 | Khvostov .......... G06Q 30/0246 |
| 2017/0300961 A1* | 10/2017 | Khvostov .......... G06Q 30/0246 |
| 2018/0013840 A1* | 1/2018 | Mitevski ............... H04L 67/141 |
| 2018/0082054 A1* | 3/2018 | Khwaja .................. H04L 67/02 |
| 2018/0137480 A1* | 5/2018 | Houghton, IV ....... G06F 1/1698 |
| 2019/0073729 A1* | 3/2019 | Cheng-Shorland ......................... |
| | | G06Q 30/0645 |
| 2019/0122203 A1* | 4/2019 | Kumawat ............ G06Q 20/382 |
| 2020/0394705 A1* | 12/2020 | Daie ................... G06Q 30/0643 |
| 2021/0133760 A1* | 5/2021 | Lew ..................... G06Q 20/425 |
| 2021/0279766 A1 | 9/2021 | Garrett |
| 2021/0288806 A1* | 9/2021 | Wakita .................. H04L 9/3242 |
| 2021/0390560 A1* | 12/2021 | Kojima ................ G06Q 20/208 |
| 2022/0067733 A1* | 3/2022 | White ................. G06Q 20/3267 |
| 2022/0237647 A1* | 7/2022 | L'Huillier .............. G06Q 20/34 |
| 2022/0300970 A1* | 9/2022 | Mudumbai Srinivasa .................. |
| | | G06K 19/06028 |

OTHER PUBLICATIONS

Lim, Weng Marc, "Online Group Buying: Some Insights from the Business-to-Business Perspective," Industrial Marketing Management 65 (2017): 182-193 (Year: 2017).

* cited by examiner

FIG. 5

INVENTORY MANAGEMENT SYSTEM PROTECTION FOR NETWORK TRAFFIC SURGE RESISTANT PLATFORM

RELATED APPLICATIONS

This application is related to U.S. patent application Ser. No. WW/WWW,WWW entitled "GROUP INVENTORY MANAGEMENT FOR A NETWORK TRAFFIC SURGE RESISTANT PLATFORM", filed on the same day. This application is also a continuation-in-part of U.S. patent application Ser. No. 17/865,893 entitled "NETWORK TRAFFIC SURGE RESISTANT PLATFORM," filed on Jul. 15, 2022, U.S. patent application Ser. No. 17/865,906 entitled "DYNAMIC USER INTERFACE FOR A NETWORK TRAFFIC SURGE RESISTANT PLATFORM," filed on the Jul. 15, 2022, U.S. patent application Ser. No. 17/865,933 entitled "INVENTORY MANAGEMENT FOR A NETWORK TRAFFIC SURGE RESISTANT PLATFORM," filed on Jul. 15, 2022, U.S. patent application Ser. No. 17/865,951 entitled "INVENTORY MANAGEMENT SYSTEM PROTECTION FOR NETWORK TRAFFIC SURGE RESISTANT PLATFORM," filed on Jul. 15, 2022, and U.S. patent application Ser. No. 17/865,989 entitled "INVENTORY MANAGEMENT SYSTEM PROTECTION FOR NETWORK TRAFFIC SURGE RESISTANT PLATFORM," filed on Jul. 15, 2022, each of which is herein incorporated by reference in their entirety.

TECHNICAL FIELD

The present invention is generally related to webhosting of electronic commerce and, more specifically, management of surge network traffic to an electronic commerce platform.

BACKGROUND

Purchasing high demand goods and/or services, such as popular toys or event tickets, can be frustrating for consumers and potentially debilitating for electronic commerce platform providers. Increasingly, merchants use flash sales or other such events where all or part of the available inventory is, for a limited amount of time, offered to a group of people at a special price and/or is offered as an opportunity to purchase before the general public. Merchants may use such events to offer benefits to a particular group of customers (e.g., premium members, students, faculty, etc.), as a form of price differentiation, and/or to capture the attention of highly motivated customers, etc. Sometimes, instead of a preplanned event, consumer interest in a good or service is so high that a similar surge in traffic is generated upon an initial offer of the good or service. In such scenarios, instead of managing infrastructure (e.g., servers, databases, network bandwidth, etc.) for mean site traffic, the merchant's site must be configured to handle relatively infrequent surges of high network traffic volume that include a large number of requests into the merchant's backend infrastructure. For example, a flash sale can act like a denial of service attack, but where the traffic is entirely legitimate. Often, backend systems, such as inventory management systems, are built with older technology that cannot handle the massive volume of queries into its databases. Such backend systems can be overwhelmed by these high traffic value events.

SUMMARY

Systems and methods for providing an electronic commerce platform that manages surges of high network traffic volume while protecting backend computing resources are described herein. For an offer of goods and/or services, the platform provider generates a static package that is placed in networked storage (e.g., networked object storage, etc.) that is accessible through a web service interface. The package contains the information required to instantiate and render the interface of the store, as well as information that is necessary to complete a transaction. When the offer is electronically communicated via a link, the linked location on the merchant platform's server includes just enough HTML instructions to retrieve the package from the storage and instantiate the interface. Based on the contents of the package, the interface of the merchant platform is then rendered in the browser of the customer using the processor and resources of the customer's computer (e.g., not resources a server of the merchant platform). During this process, the graphical elements of the interface may be retrieved from the networked storage. Based on the contents of the package, the rendered interface presents available inventory and performs cart management (e.g., presenting available inventory, selecting/deselecting goods and/or services to be placed in the cart, etc.) using resources of the customer's computer without making any calls to a server to query an inventory management system. The interface only performs backend calls (e.g., calls to the merchant platform server, etc.) when necessary to complete the next stage of the transaction (e.g., after the customer takes an affirmative step in the transaction). For example, when the customer clicks on an action button that signals that they desire to proceed with checking out, a call to an inventory server to query the relevant inventory management system(s) is made to place a temporary hold on the desired inventory. The rendered interface collects information to authenticate the identity of the customer and collects payment information. The interface then performs backend calls to the relevant system (e.g., the payments system, the customer management system, etc.) to verify the customer's information and process the payment. After the payment is processed and the customer is identified, the merchant platform makes a call to the inventory management system to reserve the goods and/or services for the customer.

To minimize processing before a transaction is complete, some inventory management systems may limit information provided to the commerce platform until the final stages of a transaction. The commerce platform includes an adaptor for each inventory management system that provides hardware and/or software solutions to protect the inventory management systems from the surge-induced large volume of transactions that take into account the technical and hardware limitations of the associated inventory management systems. The adaptor may maintain a parallel ledger where the inventory slices, in the offer package associated with the corresponding inventory management system, are based on the internal ledger and the status of available inventory as tracked by the internal ledger. The adaptor may, from time-to-time, reconcile the internal ledger with the inventory management to account for any differences. The adaptor may divide the transactions involved in an order such that at least some transactions may be performed when the inventory management system is available and/or temporally space a large number of transactions that occur in a short period of time. The adaptor may temporarily reserve the inventory during a period that does not have a surge of network traffic to determine characteristics of the inventory that can be presented to a customer during a network surge without burdening the inventory management system. When inventory is selected and the inventory management system is queried to reserve inventory, the presented information is compared to the actual information. When the predicted information matches the actual information, the transaction proceeds. When the predicted information does not match the actual information, the adaptor reconciles the differences.

A network traffic surge resistant system includes network storage and one or more servers configured as a commerce. The commerce platform operates an adaptor between the commerce platform and an inventory management system. The adaptor protects the inventory management system from transactions generated by a surge of network traffic directed at the commerce platform. The commerce platform generates a script, an offer package, and an offer instantiator based on inventory information received by the adaptor. The commerce platform stores the script and the offer package onto the network storage. The offer instantiator provides the location of the script and the offer package in the network. In response to a browser operating on a computing device accessing the offer instantiator, the offer instantiator causes the browser to retrieve the script and the offer package from the network storage. The script causes the browser to instantiate a cart interface within the browser based on the offer package using the resources of the computing device without making a backend call to the commerce platform. The cart interface includes an action button. The script also causes the browser to perform cart management functions without making a backend call to the commerce platform until detecting an interaction with the action button.

BRIEF DESCRIPTION OF THE DRAWINGS

Operation of the present disclosure may be better understood by reference to the following detailed description taken in connection with the following illustrations, wherein:

FIG. 5 illustrates an example cart interface, according the teachings of this disclosure.

DETAILED DESCRIPTION

Figure 1:
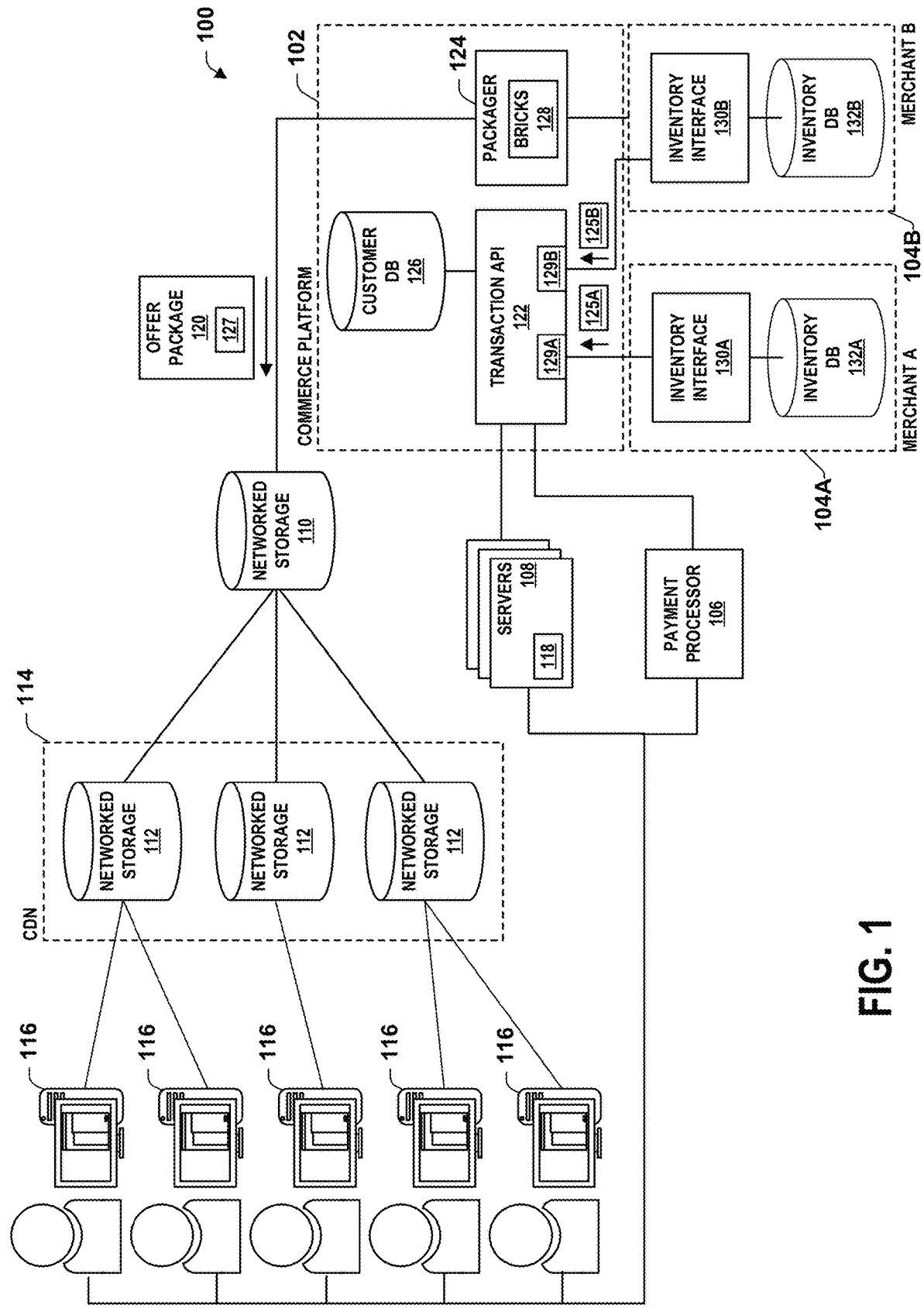
FIG. 1 is a block diagram of an example system to provide an electronic commerce platform to manage a surge of network traffic, according to the teachings of this disclosure.

Reference will now be made in detail to exemplary embodiments of the present disclosure, examples of which are illustrated in the accompanying drawings. It is to be understood that other embodiments may be utilized, and structural and functional changes may be made without departing from the respective scope of the present disclosure. Moreover, features of the various embodiments may be combined or altered without departing from the scope of the present disclosure. As such, the following description is presented by way of illustration only and should not limit in any way the various alternatives and modifications that may be made to the illustrated embodiments and still be within the spirit and scope of the present disclosure.

As used herein, the words "example" and "exemplary" mean an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggests otherwise.

Commerce platforms that offer high demand and/or limited time offers for goods and/or services often require backend systems (e.g., physical and/or virtual servers, databases, network bandwidth, etc.) that are deployed to meet or scale to surges in network traffic as a large number of customers simultaneously attempt to procure the goods and/or services. For example, platforms that handle ticket sales for major events (e.g., sports, concerts, etc.) often see such surges in network traffic as tickets are released. These surges can be orders of magnitude greater than the mean or ordinary network traffic and can overwhelm the commerce platform and its surrounding infrastructure with the flood of Internet traffic. Managing these sources can be costly and error prone, as it depends on recognizing the surge and differentiating the surge from illegitimate traffic (e.g., a denial of service attack, etc.). Additionally, in many cases, some backend systems, such as inventory management systems, are deployed using technology that is hard to scale (if even possible) and cannot handle the volume of requests necessary to service the traffic. For example, generally scalability must be part of the design of a database and many inventory systems were deployed before scalability was required. This can lead to slowing, instability and/or termination of the operation of the ecommerce platform because the network and the backend system cannot cope or adapt quickly to the surge. Attempted techniques, such as queues and timed inventory reservation systems, etc., are often not effective in mitigating the effects of surge in the network traffic and can be used by malicious actors and/or undesirable consumers to deny some or all customers access to purchasing the goods and/or services on the commerce platform. Accordingly, there are technical problems that prevent a commerce platform from being able to manage surges in network traffic volume without negatively affecting the backend systems that comprise the commerce platform.

Often, to protect, for example, the integrity of the databases of an inventory management system (IMS), the merchant operating the IMS will limit the amount that the IMS may be accessed, especially if the access request requires one or more queries into the database. For example, creating a list of available inventory to provide to the commerce platform can be a relatively resource intense process, such that the merchant operating the IMS may further limit the interval or frequency at which such a comprehensive list of inventory can be generated. In some examples, the merchant may establish an upper limit on how many requests can be made in a period of time (e.g., a limit of requests per minute, etc.). Often, these IMS cannot scale or otherwise mitigate the technical limitations of their hardware and software without slowing transactions down. While there is an incentive for the merchant to allow as much traffic as possible (e.g., to sell inventory), the limitations of legacy hardware and software that are not capable of handling a high volume of transactions that accompany a surge of network traffic aimed at the commerce platform are technical barriers. A commerce platform that is experiencing a legitimate surge of network traffic may risk becoming out of sync with the IMS as transactions are processed and inventory is presented by the commerce platform faster than the IMS can technically handle. Thus, there needs to be a technical system to manage inventory in conjunction with the IMS that protects the integrity of the database of the IMS, protects the commerce platform, and keeps the commerce platform and the IMS in sync during a surge of network traffic.

The term "server" has its ordinary meaning. Generally, a server provides computational services in a request—response model where, in response to a request (sometime referred to as a "call") over a network, the server performs some computational action and sends a response back to the requesting computer. As used herein, a "backend call" refers to a request by an interface operating on the computing device of a customer to a non-static network resource (e.g., a server, a database, etc.). A "backend call" generally requires the server(s) of the commerce platform to process the request and generate information to be sent to the requester that is responsive to the contents of the request. For example, the backend call may require a query into an inventory database to determine status of inventory associated with the offer. Through the intensity can vary, backend calls are relatively computationally intensive to network resources. The terms "network storage" and "cloud storage" have their ordinary meaning. Generally, network storage provides object storage through a web service interface to facilitate remote storage and retrieval of data objects. As used herein, a "static call" refers to a request to a static network resource, such as networked storage that stores data objects (e.g., visual elements for an interface, scripts to be executed by the interface, offer packages, etc.). Static calls are relatively computationally inexpensive. As used herein, an "offer instantiator" refers to a document designed to be processed in a web browser that includes (i) structure (e.g., written in HTML code, etc.) necessary to render a cart interface, (ii) a location of where to receive a related offer package (e.g., from networked storage), and (iii) a location to receive a script to render the cart interface using the structure and the offer package.

A merchant and/or offer aggregator that desires to make an offer via a surge traffic resistant commerce platform ("commerce platform") generates an offer package through the commerce platform. For example, a merchant may generate the offer package with inventory associated with its own inventory management system(s), multiple merchants may generate the offer package with inventory associated with each of their inventory management systems, or an offer aggregator may generate the offer package with inventory associated with inventory management systems of multiple merchants. The offer package contains information necessary to render a cart interface and browse inventory associated with the offer without making backend calls to the commerce platform or any inventory management system tracking the inventory associated with the offer. The package may be, for example, generated in a data-interchange format. The packages are then stored on one or more static network storage devices. To communicate the offer, the commerce platform creates a link (e.g., a Uniform Resource Locator (URL), etc.) that points to an address that contains the location of the offer package, the location of the script to render the cart interface, and a minimum amount of code (e.g., HTML, etc.) necessary to use the script to render the cart interface.

When a consumer activates the link, the consumer's browser fetches the offer package and the script to render the cart interface (e.g., by generating browser readable code, etc.) on the commuting device executing the browser. That is, instead of a server (e.g., one of the servers of the commerce platform) generating the cart interface and then sending the browser readable code defining the cart interface to the browser, the computing device of the customer generates the browser readable code for the cart interface using the script and based on the offer package. In such a manner, when a surge of customers are simultaneously or near simultaneously interacting with the cart interface, a corresponding surge of network traffic is not generated directed at the servers of the commerce platform and those servers are not overwhelmed by the resulting processing to generate and update the cart interface. The cart interface includes an action button. The browser generated cart interface performs pre-checkout cart management functions using the resources of the browser without making inventory or checkout related backend calls to the servers of the commerce platform until the action button is activated (e.g., "clicked on") by the customer. These pre-checkout cart management backend functions include browsing inventory (e.g., names, descriptions, and/or prices of inventory available through the offer, etc.), receiving an indication of the type and/or quantity that the customer desires to purchase, and/or calculating an estimated total cost of the indicated type and quantity. Because the package includes all of the inventory information (e.g., offer details, identities and descriptions of inventory available with the offer, price, etc.), the cart interface performs these pre-checkout functions without making any backend calls. Thus, a surge of customers browsing inventory, many of whom are not likely to complete a purchase, does not create a corresponding surge in network traffic or server load for the commerce platform. From time-to-time, the commerce platform may asynchronously regenerate the offer package to change any part of the offer, including available inventory, the theme or template, etc., to replace the previous package at the same location in the static network storage. Thus, the merchant may dynamically update the cart interface without causing a surge of network traffic or server load.

When the customer activates the action button, the browser renders, based on the offer package, a checkout interface and makes a backend call that includes the identities and quantities of the inventory in the current cart of the cart interface. This backend call causes one of the servers to calculate the actual (e.g., non-estimated) cost, including the unit cost of each item and any associated fees, to the items in the cart and report that total to the checkout interface. In some examples, the method to calculate the non-estimated cost may depend on which inventory management system the inventory is associated in the current cart of the cart interface. In some examples, the applicable fees associated with the inventory may be known or calculable based on fee information received from the corresponding merchant. In some examples, the server may determine the non-estimated cost by predicting the non-estimated cost based on the attributes of the inventory item and the information retrieved from the corresponding inventory management system. The customer may change quantities (e.g., add quantities, subtract quantities, delete items, etc.) in the checkout interface. Each change results in the backend call to calculate the total cost of the items. These price calculations are performed without querying the inventory management system of the merchant. Thus, a large number of such backend calls does not result in an increased load on the merchant's inventory management system. In some examples, these backend calls are configured to be computationally light to reduce any strain on the servers of the commerce platform.

When the browser receives the calculation, the checkout interface displays the total. The checkout interface performs a redirect to a payment processor. In some examples, this causes the payment processor to instantiate one or more payment electronic widgets (e.g., a Google® Pay widget, an Apple® Pay widget, etc.) and/or a credit card payment widget in the checkout interface. Interacting with one of the electronic payment widgets or the credit card payment widget (e.g., providing payment credentials, etc.) causes the payment processor to generate a payment intent that places a hold on funds equal to the calculated amount. Up to this point, the merchant platform does not make any call to the inventory management system of the merchant. After the payment processor signals that the payment intent was successful, the commerce platform attempts to place a reserve on the items with the inventory management system of the merchant. When the inventory management system signals that the attempt to reserve the inventory was successful, the commerce platform initiates one or more authenticity/security checks (sometimes referred to as "authorization challenges") with the customer via the checkout interface. When all of the authenticity/security checks are successful, the commerce platform requests that the inventory management system place the reserved items in a fulfillment status. The commerce platform then signals the payment processor to complete the transaction based on the purchase intent. The commerce platform then performs post-purchase fulfillment actions via the checkout interface. In such a manner, the commerce platform minimizes network traffic, server load, and load on the inventory management system by only generating such activity when the customer has affirmatively signaled their desire to complete a transaction and only to the extent necessary for their current level of commitment.

Different inventory management systems have different technical and hardware limitations that prevent them from processing and/or making database calls necessary to performs inventory management for a large number of simultaneous or near simultaneous inventory requests that accompany an offer that generates a surge of network traffic. For example, one inventory management system may not have the bandwidth to efficiently process the surge-induced transactions and another inventory management system may not have a database that can handle a large volume of database calls in a relatively short amount of time. As used herein, a transaction refers to a call to an inventory management system. The transaction may result in a query into the database of the inventory management system. To minimize processing before a transaction is complete, some inventory management systems may limit information provided to the commerce platform until the final stages of a transaction. In some examples, the inventory management system may not set any limitations but the adaptor may act as described herein to project the inventory management system from the surge of traffic towards the inventory management system generated by the surge of network traffic towards the commerce platform. As described herein, the commerce platform includes an adaptor for each inventory management system that provides hardware and/or software solutions to protect the inventory management systems from the surge-induced large volume of transactions that take into account the technical and hardware limitations of the associated inventory management system. In some examples, the inventory management system may limit the frequency of transactions (e.g., queries into the database) because of the software and/or hardware limitation of the inventory database, such that it cannot perform transactions frequently enough to handle a surge of transactions generated by a surge in network traffic to the commerce platform. In such an example, one adaptor may maintain a parallel ledger where the inventory slices, in the offer package, associated with the corresponding inventory management system are based on the internal ledger and the status of available inventory as tracked by the internal ledger. In some such examples, the adaptor from time-to-time reconciles the internal ledger with the inventory management to account for any differences. An example of such an adaptor is described in U.S. patent application Ser. No. 17/865,951 entitled, "Inventory Management System Protection for Network Traffic Surge Resistant Platform," filed Jul. 15, 2022, which is herein incorporated by reference in its entirety.

To complete an order, it may take multiple interactions or transactions (e.g., ten, twelve, seventeen, etc.) with the inventory management system from initially reserving the inventory to fulfillment of the inventory. In such examples, the inventory management system may restrict the frequency or number of transactions in a period of time (e.g., one hundred transactions per hour, etc.) In some examples, the adaptor divides the transactions involved in an order into a set of reserve transactions and a set of completion transactions. The reserve transactions are transactions with the inventory management system that are necessary to mark the transaction as reserved. The completion transactions are transaction necessary to fulfill the order for the items. From a customer point of view, the commerce platform performs the steps described herein to complete an order. During this process, the adaptor performs the reserve transactions. The complete transactions are associated with the order and placed in a transaction queue. The adaptor performs transactions in the transaction queue when transactions are available. In such a manner, reserve transactions are prioritized during the surge of network traffic.

In some examples, the inventory management system may limit data sent in response to queries until, for example, the query causes the associated inventory to be reserved (e.g., from a "reserved" status to a "fulfill" status, etc.). For example, a merchant may not respond with any pricing, fee, or other information related to the item until a query causes the item to be reserved because, while one request may not cause a significant processing burden, a surge of requests may cause the inventory management system to experience a processor burden. In such examples, the corresponding adaptor estimates or predicts the missing information to provide it to the browser before the customer checks out. In some examples, the adaptor temporarily reserves the inventory during a period that does not have a surge of network traffic. In some examples, the adaptor reserves the inventory slice-by-slice and stores the information received to include the offer package. In some examples, the adaptor temporarily reserves a representative sample of each slice to predict the information based on the attributes of the sampled inventory. Later, when inventory is selected and the inventory management system is queried to reserve inventory, the predicted information is compared to the actual information. When the predicted information matches the actual information, the transaction proceeds. When the predicted information does not match the actual information, the adaptor reconciles the differences.

FIG. 1 is a block diagram of an example system 100 to provide an electronic commerce platform 102 to manage a surge network traffic. In the illustrated example, the commerce platform 102 is communicatively coupled to inventory management systems 104A and 104B of merchant networks (sometimes collectively referred to as "merchant networks 104") and payment processors 106. The commerce platform 102 is also communicatively coupled to one or more webservers 108 (e.g., physical servers, virtual servers, and/or virtualized containers, etc.) and one or more network storage devices 110 (e.g., Amazon® S3, Google® Cloud Storage, Azure® Blob Storage, IBM® Cloud Object Storage, etc.). Data objects stored in the network storage devices 110 may be pushed onto network storage devices 112 that are part of a content delivery network (CDN) 114 to be accessed by browsers operating on computing devices 116 (e.g., desktop computers, laptop computers, smart phones, tablets, smart televisions, etc.). The commerce platform 102 facilitates generation of offer instantiators 118 and offer packages 120 by merchants and/or offer aggregators to offer goods and/or services managed by the merchant networks 104 though the commerce platform 102.

The commerce platform 102 includes a transaction application programming interface (API) 122, a packager 124, and a customer database 126. While in the illustrated example, the transaction API 122, the packager 124, the customer database 126, and the webservers 108 are illustrated as being conceptually grouped in a certain configuration for simplicity, these components may be otherwise situated in any suitable manner (e.g., on cloud servers, etc.). The transaction API 122 facilitates communication between the webservers 108, the payment processor 106, the merchant network 104, and the customer database 126. The packager 124 receives input from the merchant to generate the offer instantiator 118 and the offer package 120 using software bricks 128. In some examples, the package 124 generates the offer package 120 in a data-interchange format (e.g., JavaScript Object Notation (JSON), Extensible Markup Language (XML), YAML, etc.). The software bricks 128 are offer package components that define the parameters, metadata, available inventory and/or audiovisual assets of the offer and the interrelationship between these parameters, metadata, available inventory and/or audiovisual assets. The customer database 126 stores customer information to facilitate assigning an order from a checkout interface in a browser to a particular account or accounts for security and fulfillment purposes. The structure and organization of the offer package 120 are dictated by which bricks are used to generate the offer package 120.

Using the packager 124, the merchant or an offer aggregator defines the offer and specifies one or more merchant networks 104 to supply inventory data objects 125A and 125B (collectively "inventory data objects 125") that each specify available inventory for the offer and attributes of the inventory that the merchant uses to distinguish the inventory. In some examples, the inventory data objects 125 comprise a two dimensional table with a row for every good or service to be offered or class of goods or services to be offered (e.g., for non-fungible items) with one or more attributes related to the goods or services. For example, the data object 125 may include a row for each seat in a venue that is to be part of the offer, and a column for the section number, a column for the row number, a column for the seat number, and a column for a classification of the seat (e.g., student seating, VIP seating, etc.).

The transaction API 122 includes an adaptor 129A and 129B (collectively "adaptors 129") for each merchant network 104 connected to the commerce platform 100. The adaptors 129 are a collection of processes and/or services that manage communication (e.g., transactions, etc.) in a corresponding merchant network 104 to manage traffic to the merchant network 104 to protect it from a surge of transactions due to a surge of network traffic to the commerce platform 100. The adaptors 129 use rules and processes that take into account the hardware, software, and/or bandwidth limitations of the associated merchant network 104. In some examples, the adaptors 129 present a uniform interface to the transaction API 122 such that the transaction API 122 directs queries to the appropriate one of the adaptors 129 (e.g., to provide the non-estimated price, to process an order for an item, etc.) but does not itself format those queries to take into account the limitations of the merchant network 104. The adaptors 129 may operate on one or more servers separate from the transaction API 122. In some examples, the adaptors 129 may each operate on separate servers. In some examples, the adaptors 129 are collocated with the servers that host the corresponding inventory interface 130A and 130B.

The packager 124 generates a unique link (e.g., a URL link, etc.) that instructs a browser where to locate the offer instantiator 118. The offer package 120 contains the information necessary for the offer instantiator 118, when accessed by a browser, to render the cart interface and the checkout interface, including a description of the available inventory, to facilitate a customer browsing the inventory through the cart interface without making any backend calls to the webservers 108 and/or the transaction API 122. As part of generating the offer package 120, the packager 124 slices the inventory data object 125 and/or proxies for the inventory data object 125 provided by the adaptors 129 (e.g., internal ledgers, etc.) into inventory slices 127. The inventory slices 127 are, as explained below, packaged into the offer package 120. After the offer instantiator 118 and offer package 120 are created, the packager 124 publishes the instantiator 118 onto the webservers 108 and pushed the offer package 118 onto the networked storage 110 and 112. The link to the instantiator 118 may then be provided to customers. In the illustrated example, the instantiator 118 is located on a server and is accessible via a domain that is controlled/operated by the commerce platform 102. Alternatively, in some examples, the instantiator 118 may be located on a server and accessible via a domain that is controlled/operated by another party (e.g., the merchant network 104, a third party, etc.).

The offer package 120 may be regenerated from time-to-time with new and/or updated parameters, metadata, available inventory and/or audiovisual assets of the offer. For example, the offer packager 124 may regenerate the offer package 120 in response to a change in the parameters and/or metadata associated with any of the bricks 128 that were used to generate the offer package 128, and/or in response to significant changes to inventory as communicated by one of the adaptors 129. For example, the offer packager 124 may regenerate the offer package 120 when one of the adaptors 129 indicates that an entire inventory slice 127 associated with it is no longer available. When the offer package 120 is rebuilt, the packager 124 pushes the updated offer package to replace the old offer package in the networked storage 110 and 112. In such a manner, the merchant can dynamically and asynchronously update the offer package 130 while customers access the offer instantiator 118 without interruption.

The example merchant networks 104 each includes an inventory interface 130A and 130B (collectively "inventory interfaces 130") and an inventory database 132A and 132B (collectively "inventory databases 132"). The inventory interfaces 130 and the inventory databases 132 may be collectively referred to as an "inventory management system" or "IMS." For each of the merchant networks 104, the inventory from which its inventory data object 125 is compiled is stored in its inventory database 132. The inventory interface 130, using the inventory database 132, provides the inventory data object 125. The inventory interface 130 may also manipulate the inventory in the inventory database 132 by, for example, changing the status of the inventory (e.g., reserving the inventory, marking the inventory for fulfillment, etc.). In some examples, because too frequent compilations of inventory may cause the degradation or loss of operation of the IMS (e.g., the inventory database 132) and/or may interfere with the ability of the IMS to change the status of the inventory as purchases are made, the inventory interface 130 may set a refresh interval limit frequency at which the packager 124 may request a refresh of the inventory data object 125. The hardware and/or software of the inventory database 132 may not be capable of handling transactions at the rate they are generated by the surge of network traffic. For example, the refresh interval may be set such that the minimum amount of time that the transaction API 122 may request the inventory data object 125 is three minutes. Additionally, in some examples, the inventory interface 130 may establish a maximum number of requests or transactions per a time period (e.g., 200 requests per minute, etc.). However, for example, to complete an order, the transaction interface 122 may need to make ten transactions to the inventory interface 130. The adaptors 129 are configured to complete orders while protecting the inventory management system and taking into account these limitations.

When a consumer activates the link to the offer instantiator 118, the consumer's browser performs a static call to retrieve the offer package 120 and the script to render the cart interface (e.g., by generating browser readable code, etc.) from the network storage 110 and 112. The browser then renders the cart interface by executing the script using the offer package 120, including populating the available inventory in the cart interface based on the inventory slices 127. This available inventory does not change through direct updates or making a backend call for the update. The browser generated cart interface performs pre-checkout cart management functions using the resources of the browser. These pre-checkout cart management functions include browsing inventory (e.g., names, descriptions, and/or prices of inventory available through the offer, etc.) as defined by the inventory data object (e.g., as processed by the bricks 128).

From time-to-time, the browser may refresh access to the offer instantiator 118. For example, the user may refresh the browser or the browser may receive a signal to refresh access to the offer instantiator in response to making a backend call. Then, the browser refreshes access to the offer instantiator 118, the browser performs a static call to retrieve the offer package 120 and the script to render the cart interface from the network storage 110 and 112. If the offer package 120 has been updated since the last time the offer package 120 was retrieved, the offer instantiator will cause the browser to retrieve the updated offer package 120. The browser then renders the cart interface by executing the script using the updated offer package 120, including any updated inventory slices 127.

When the customer activates the action button, the browser renders, based on the offer package 120, a checkout interface and makes a backend call that includes the identifiers (sometimes referred to as "inventory unit identifiers") that identify inventory in the current cart of the cart interface and quantities of the inventory in the current cart of the cart interface. This backend call causes one of the servers 108 to calculate the actual (e.g., non-estimated) cost, including the unit cost of each item and any associated fees, to the items in the cart and report that total to the checkout interface. In some examples, the transaction API 122 requests the appropriate adaptor 129 to calculate the actual (e.g., non-estimated) cost according to the processes and/or services operating on the adaptor 129. For example, the adaptor 129 may calculate the actual cost based on information received from the corresponding merchant network 104. As another example, the adaptor 129 may predict cost based on attributes of the item in the cart. The customer may change quantities (e.g., add quantities, subtract quantities, delete items, etc.) in the checkout interface. Each changes results in the backend call to the servers 108 to calculate the total cost of the items.

When the browser receives the calculation, the checkout interface displays the total. The checkout interface performs a redirect to the payment processor 106. In some examples, this causes the payment processor 106 to instantiate one or more payment electronic widgets (e.g., a Google® Pay widget, an Apple® Pay widget, etc.) and/or a credit card payment widget in the checkout interface. Successfully credentialing through one of the electronic payment widgets or the credit card payment widget causes the payment processor 106 to generate a payment intent that places a hold on funds equal to the calculated amount. After the payment processor 106 signals that the payment intent was successful, the transaction API 122 attempts to place a reserve on the items with the inventory management system. When the inventory management system signals that the attempt to reserve the inventory was successful, the transaction API 122 initiates one or more authenticity/security checks with the customer via the checkout interface. When all of the authenticity/security checks are successfully completed, the transaction API 122 requests that the inventory management system place the reserved items in a fulfillment status. The transaction API 122 then signals the payment processor 106 to complete the transaction based on the purchase intent. The transaction API 122 then performs post-purchase fulfillment actions via the checkout interface.

Figure 2:
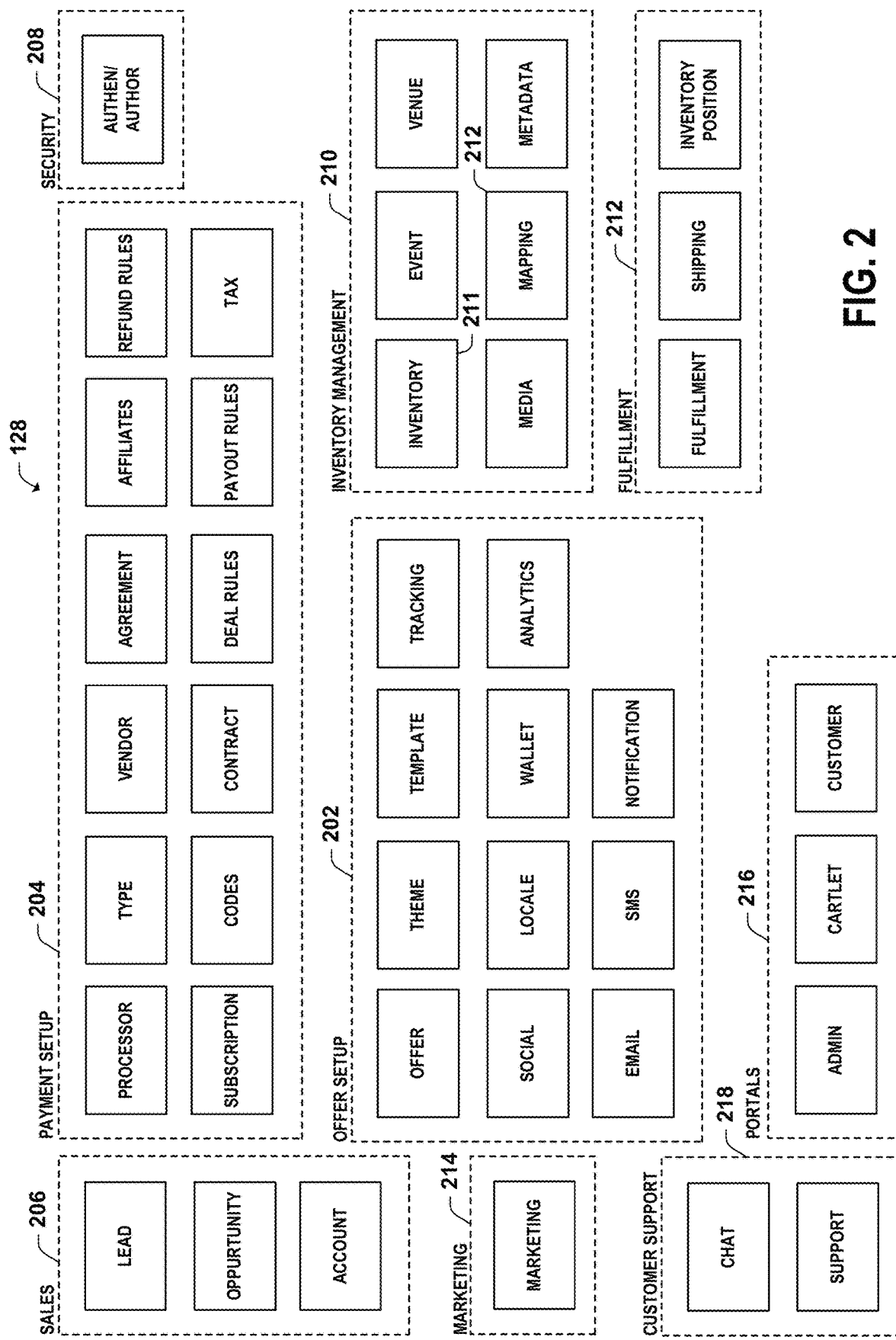
FIG. 2 is a conceptual diagram of bricks used to construct a package used to manage the surge network traffic, according to the teachings of this disclosure.

FIG. 2 illustrates examples of the bricks 128 used to define and construct the offer package 120. The bricks 128 are software structures that define the parameters, metadata, available inventory and/or audiovisual assets of the offer, the interrelationship between these parameters, metadata, available inventory and/or audiovisual assets, and the syntax of the data interchange format in which the package 120 is being created. The bricks 128 may have different versions representing different structures that may be selected depending on the desired structure of the offer package. When creating the offer package 120, the merchant may select the relevant bricks 128 to define the look and feel, the functionality, inventory management and grouping, and the order flow associated with the cart interface that is rendered using the offer package 120 constructed using the bricks 128 selected and populated by the merchant. The bricks 128 facilitate building the offer package 120 so to include the necessary parameters, metadata, available inventory and/or audiovisual assets of the offer and/or tokens point to the parameters and/or metadata to perform front end actions (e.g., the computing device 116 rendering the cart interface for the offer) and to perform backend actions (e.g., handling payment, refunds, fund allocation, customer service, etc.). In the illustrated example, the bricks 128 are arranged in thematic groups. However, the bricks 128 may be arranged in any manner. For example, when the packager 124 packages the selected bricks 128, into the offer package 120, the resulting structure of the offer package 120 mirrors the bricks 128. In some examples, the bricks 128 define interface elements that translate the structure of the bricks into interactable objects within an interface to design an offer. The interactable objects have inputs that facilitate receiving the information necessary to render the component of, for example, the cart interface and define relationships between the bricks 128. As such, as bricks 128 are added to an offer, a corresponding interface in an offer editor is generated.

In the illustrated example of FIG. 2, a group of bricks 128 is classified in an offer setup group 202. The bricks 128 in the offer setup group 202 are used to build the look and feel of the cart interface as well as the operation of the cart interface related to the specific offer. A group of bricks 128 is classified in a payment setup group 204. The bricks 128 in the payment setup group 204 are used to define rules for a transaction made of the specific offer and establish a transactional route and history for every good and/or service purchased through the offer. A group of bricks 128 is classified in a sale group 206. The bricks 128 in the sales group 206 interface with external servers to connect offers to the merchant and facilitate merchant account management. The offer setup group 202, the payment setup group 204, and the sales group 206 contribute structure and metadata to the offer package 120 to facilitate forensically tracing and justifying any transaction that is made according to the offer package 120 and to supply a system with information to complete a transaction while minimizing the transaction's use of backend calls.

In the illustrated example, a group of bricks 128 is classified in a security group 208. Bricks 128 in the security group 208 provide parameters and metadata for performing the multiple security check to authenticate a customer and check if the customer is authorized to perform the transaction. A group of bricks 128 is classified in an inventory management group 210. Bricks 128 in the inventory management group 210 provide parameters and metadata for slicing and presenting inventory in the cart interface and interfacing with the inventory management system of the merchant. An inventory brick 211 provides a connector between the packager 124 and an adaptor 129 connected to the IMS of one of the merchant networks 104. The inventory brick 211 includes, for example, specific API calls and limitations and/or parameters for those calls for the specific IMS of the merchant 104. For example, the inventory brick 211 may track the number of requests available to the inventory interface 130 and/or track the trigger to request an updated inventory data object 125 from the inventory interface 130. In some examples, the packager 124 may include multiple inventory bricks 211 when multiple merchants networks 104 are involved in the offer. The inventory brick(s) 211 retrieve or otherwise receive the inventory data object 125 from the IMS of the corresponding merchant network 104. The parameters of the inventory brick 211, for example, may be a specific setting related to the adaptor 129 and the rules used by the adaptor 129 to protect the IMS of the merchant network. A mapping brick 212 receives inventory data object(s) 125 (or their equivalent) from the adaptor(s) 129 and facilitates the merchant 104 and/or the commerce platform 102 into slicing the inventory data object(s) 125 into the inventory slices 127 to be included in the offer package 120 such that (a) the corresponding inventory is arranged/organized in the cart and/or checkout interface and (b) inventory has an appropriate quantity picker assigned in the cart and/or checkout interface, etc. In some examples, the mapping brick 212 maps the inventory slices 127 based on inventory data objects 125 from multiple merchant networks 104 into a single offer package 120. A group of bricks 128 is classified in a fulfillment group 213. Bricks 128 in the fulfillment group 213 provide parameters and metadata for fulfilling and delivering inventory after a successful transaction. A group of bricks 128 is classified in a marketing group 214 to provide support to attributing sales of goods and/services to parties involved in completing the transaction (e.g., first party or third party sales agents, etc.). A group of bricks 128 is classified in a portals group 216. Bricks 128 in the portals group 216 provide top level structure to packages, including the offer package 120. A group of bricks 128 is classified in a customer support group 218 that includes structure, parameters, and metadata to render a customer support interface and to process customer support requests while minimizing the number of backend calls the customer's browser performs.

Figure 3:
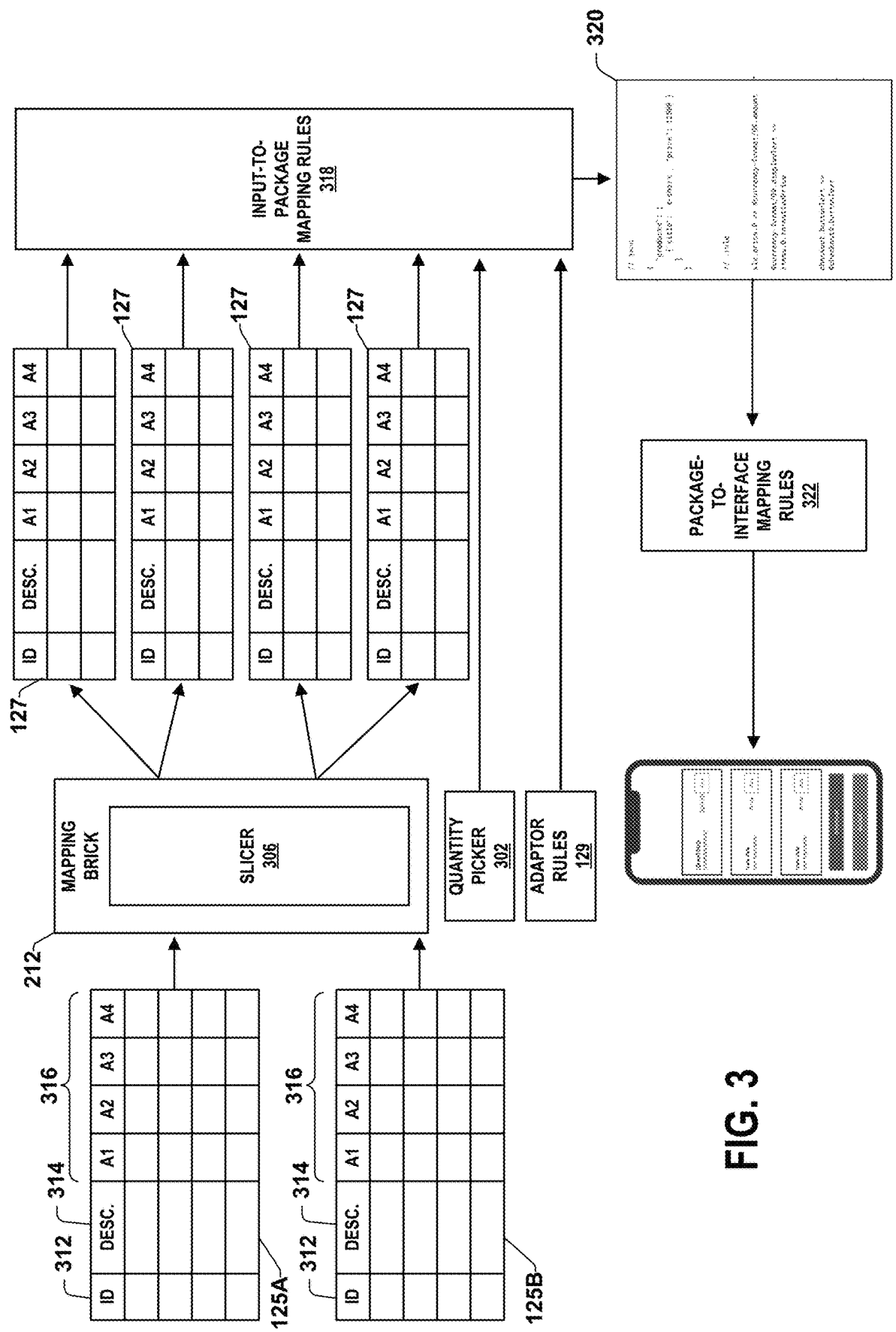
FIG. 3 is a conceptual diagram of the packager of FIG. 1 generating an offer package, according to the teachings of this disclosure.

FIG. 3 is a conceptual diagram of the packager 124 of FIG. 1 generating the offer package 120. The packager 124 uses a plurality of bricks 128 to define the content of the offer package 120 and the structure of the offer package 124 that will be used to instantiate the cart and checkout interfaces using the resources of the computing devices 116 of the user accessing the corresponding offer instantiator 118. The merchant 102 interacts with the packager 124 through a packager interface that facilitates editing of the contents and structure of the offer package 120. The packager interface includes selectors to facilitate selection of which bricks 128 (and which subbricks, etc.) to use to generate the offer package 120 and edit the parameters and metadata associated with each of the selected bricks 128. These selectors may be graphical elements that are dragged and moved in the packager interface to select the bricks 128 and to define relationships between the bricks 128. For example, the bricks 128 may specify different widgets, different quantity pickers, different themes, different templates, define audio and/or visual assets to be used, and/or different ways to slice inventory, etc. (collectively referred to as "elements"). For example, the widgets define interactive interface elements in the cart interface that causes the hosting browser to perform an action that reaches externally from the browser (e.g., make a backend call, make a call to the payment processor 106, etc.). For example, one widget may define the parameters (e.g., size, shape, position, label, etc.) of the action button. As another example, one widget may define which third party payment processor to send information to facilitate instantiation of the payment processor's payment interface in the checkout interface.

In the illustrated example of FIG. 3, the mapping brick 212 includes a slicer 306. The slicer 306 facilitates transforming the one or more inventory data objects 125 retrieved and/or maintained via the adaptors 129 of the inventory to be included in the offer package 120 into slices of inventory 127 that have common attributes and are to be organized in the cart interface together with and each associated with a quantity picker 302. In some examples, a single inventory slice 127 may include inventory items that originate with different inventory data objects 125 linked back to the corresponding inventory data object 125. The slices 127 may further be subdivided by the slicer 306 to form a hieratical set of sliced inventory, for example in a tree structure, where the bottom slices are assigned a quantity picker 302. The inventory data objects 125 include a unique identifier 312 for each inventory item or class of inventory item. In some examples, a suffix or a prefix may be added to the unique identifier 312 to link the inventory item to the specific inventory data objects 125. For example, fungible items and/or services (e.g., such as clothing, consumables, etc.) may have an identifier that is associated with all items of the class (e.g., all shirts of the same cut, color, and size may have the same identifier, etc.), while pseudo-fungible and/or limited edition goods or services have unique identifiers. The inventory data object 125 includes a description 314 that provides a human-readable description of the goods and/or services. The inventory data object 125 includes attributes 316 that distinguish the goods in some way (e.g., descriptively (such as color, location, quality, etc.) and/or organizationally (such as discounts, relations, intangible quantifier, etc.). For example, the attributes may include a price, a group identifier, a color, a size, shape, one or more location related attributes, etc. The slicer 306 transforms inventory data objects 125 included in the slices of inventory 127 based on the attributes 316 as designated via the mapping brick 212 by the merchant.

In the illustrated example of FIG. 3, the packager 124 includes input-to-package mapping rules 318 that transform the widgets (e.g., the quantity picker(s) 302), other elements (e.g., themes, templates, and/or audio and/or visual assets to be used, etc.), and, in the illustrated example, the inventory slices 127 into a data interchange formatted file 320 for the offer package 120. The mapping rules 308 map the sliced inventory 127 to quantity pickers 302, and other information defined by and through the bricks 128 (e.g., the widgets and elements, etc.). In some examples, the input-to-package mapping rules 318 may include adaptor rules 319 that specify actions for the cart interface based on the adaptors 129. For example, the adaptor rules 319 may specify how the cost of items associated with a merchant network 129 are to be estimated and/or how to change the interface in response to a mismatch between the inventory as defined by the inventory slices 127 and the inventory in the inventory database 132 of the corresponding merchant network 104, etc. The input-to-package mapping rules 318 translate the mapped sliced inventory 127 into syntax of the data interchange format such that all of the data required to build the cart interface and the checkout interface and all of the data to perform cart management functions (e.g., displaying inventory being offered, prices, and descriptions; manipulating quantities in the cart; estimating total price, etc.) are included in the offer package 120.

In the illustrated example, the data interchange formatted file 320 is a process with package-to-interface rules 322 that specify how the elements will be graphically laid out by the cart interface and/or checkout interface based on, for example, the selected theme and template bricks and the target browser in which the interfaces will be created. For example, the package-to-interface rules 322 may define how the inventory slices 127 and the associated quantity pickers 302 are laid out on the available screen of the target browser taking into account space and processing limitations inherent in some computing devices, such as mobile devices. In some examples, the data interchange formatted file 320 may be processed by different sets for package-to-interface rules 322 to generate different versions of the offer package 120, where the offer initiator 120 causes the browser to download one of the versions of the offer package 120 based on the qualities of the browser. For example, a set of package-to-interface rules 320 may generate one offer package 120 for browsers operating on mobile devices (e.g., smart phones, smart watches, etc.), one offer package 120 for browsers operating on computing devices (e.g., desktop computers, tablets, laptop computers, etc.), and one offer package for browsers operating on mixed reality devices (e.g., virtual reality headsets, augmented reality headsets, etc.). That is, the package-to-interface rules 322 are configured to take into account limitations that are inherent in the computing device 116 that is operating the browser, such as limited screen area, existence of a touchscreen, processing power, and/or network bandwidth availability, etc. Because the input-to-package rules 318 are processed separately from the package-to-interface mapping rules 322, the rules sets 318 and 322 can be updated asynchronously. That is, the template bricks may be updated and the update will be implemented the next time the offer package 120 is published.

Figure 4:
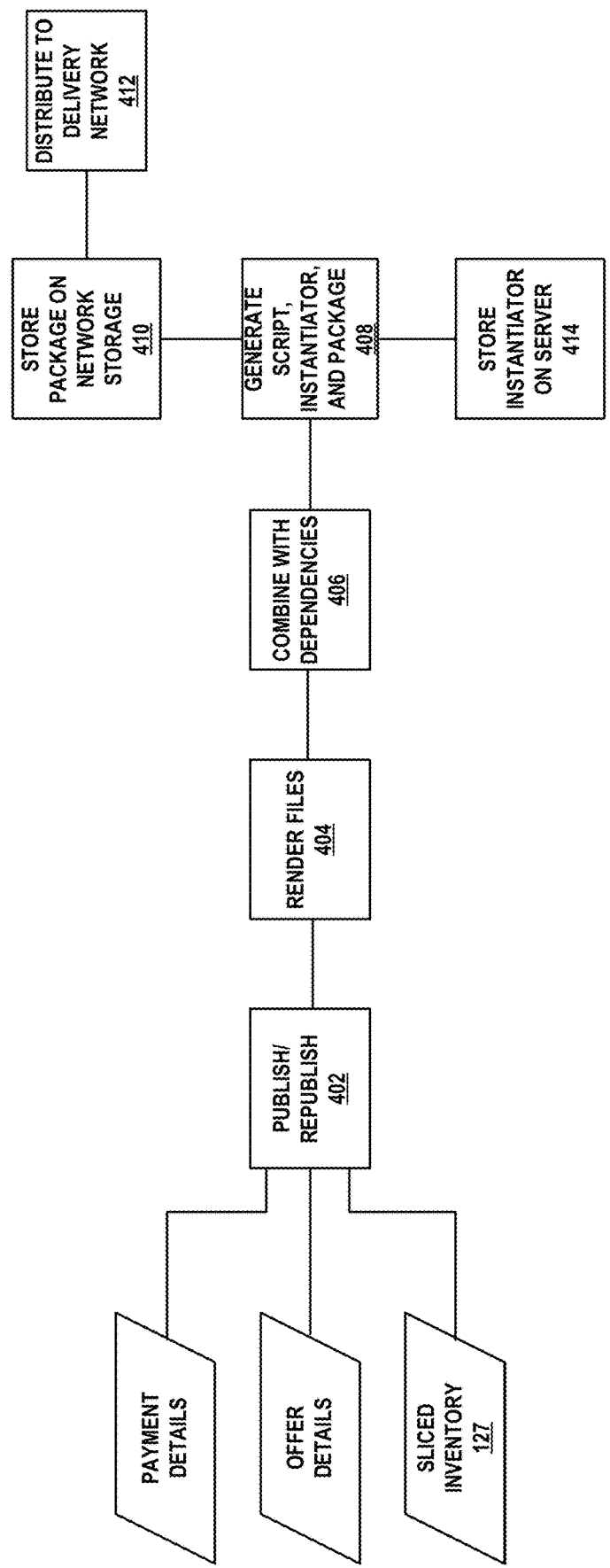
FIG. 4 is a conceptual diagram of the commerce platform of FIG. 1 publishing the offer package, according to the teachings of this disclosure.

FIG. 4 is a conceptual diagram of the commerce platform 102 of FIG. 1 publishing the offer package 120 and the offer instantiator 118. The commerce platform 102 may asynchronously publish a republish of the offer instantiator 118 and the offer package 120 without regard to whether computing devices 116 are instantiating the cart and/or checkout interface. At block 402, the entity using the commerce platform 102 (e.g., the merchant 104, etc.) indicates that the offer instantiator 118 and/or the offer package 120 should be published or republished. For example, a "publish" button may be provided in the packager interface. In some examples, republishing the offer package 120 may be based on one or more automated triggers. For examples, the offer package 120 may republish upon receipt of an updated version of the inventory data object 125 or when an adaptor 129 receives an indication that an inventory in a particular inventory slice 127 is no longer available, etc. To start the process of publishing the offer instantiator 118 and the offer package 120, the packager 124 pulls in the template, the theme, the relevant metadata and parameters from the bricks and, in the illustrated example, the inventory slices 127. At block 404, the packager 124 renders the offer package 120. In some examples, the packager 124 renders the offer package 120 in accordance to the process described in connection with FIG. 3 above. The packager 124 may perform this rendering multiple times to generate offer packages 120 to be used by different browsers. At block 406, the packager 124 retrieves dependencies that are specified by the bricks 128 used to create the offer package 120. The dependencies may be, for example, libraries, audio and/or visual files (e.g., as designated by the selected template brick, the selected theme brick, and/or the selected quantity picker brick, etc.), and/or link paths (e.g., URLs, etc.), etc. Because bricks 128 can be updated asynchronously, deficiencies that may have changed since the last time the offer package 120 was published automatically have those dependencies updated in an offer package when it is republished. At block 408, the packager 124 generates the offer package (s) 120, the script used by the browser to generate the cart and checkout interfaces, and the offer instantiator 118 to be distributed. In some examples, the packager 124 may perform versioning of the offer package(s) 120 and the script each time the offer package(s) is/are republished. The offer instantiator 118 may be changed to point the browser to the updated script and/or updated offer package(s) 120 when the browser refreshes. At block 410, the packager 124 stores the script, the offer package(s) 120, and/or any assets necessary to render the cart interfaces to the network storage 110. To prevent network traffic, especially to a large number of applicable computing devices 116, the packager 124 does not notify any of the computing devices 116 operating browsers in which the cart and/or checkout interface is instantiated that the offer package 120 is being published/ republished. At block 412, the package 124 causes the script, the offer package(s) 120, and/or the assets to be distributed to the networked storage 112 in the CDN 114. In some examples, the packager 124 sends a signal to the CDN 114 invalidating the current cache, which causes the network storage 112 in the CDN 114 to update to the latest files. At block 414, the offer instantiator 118 is moved the server(s) 108 to be accessed by the computing devices 116.

Figure 5:
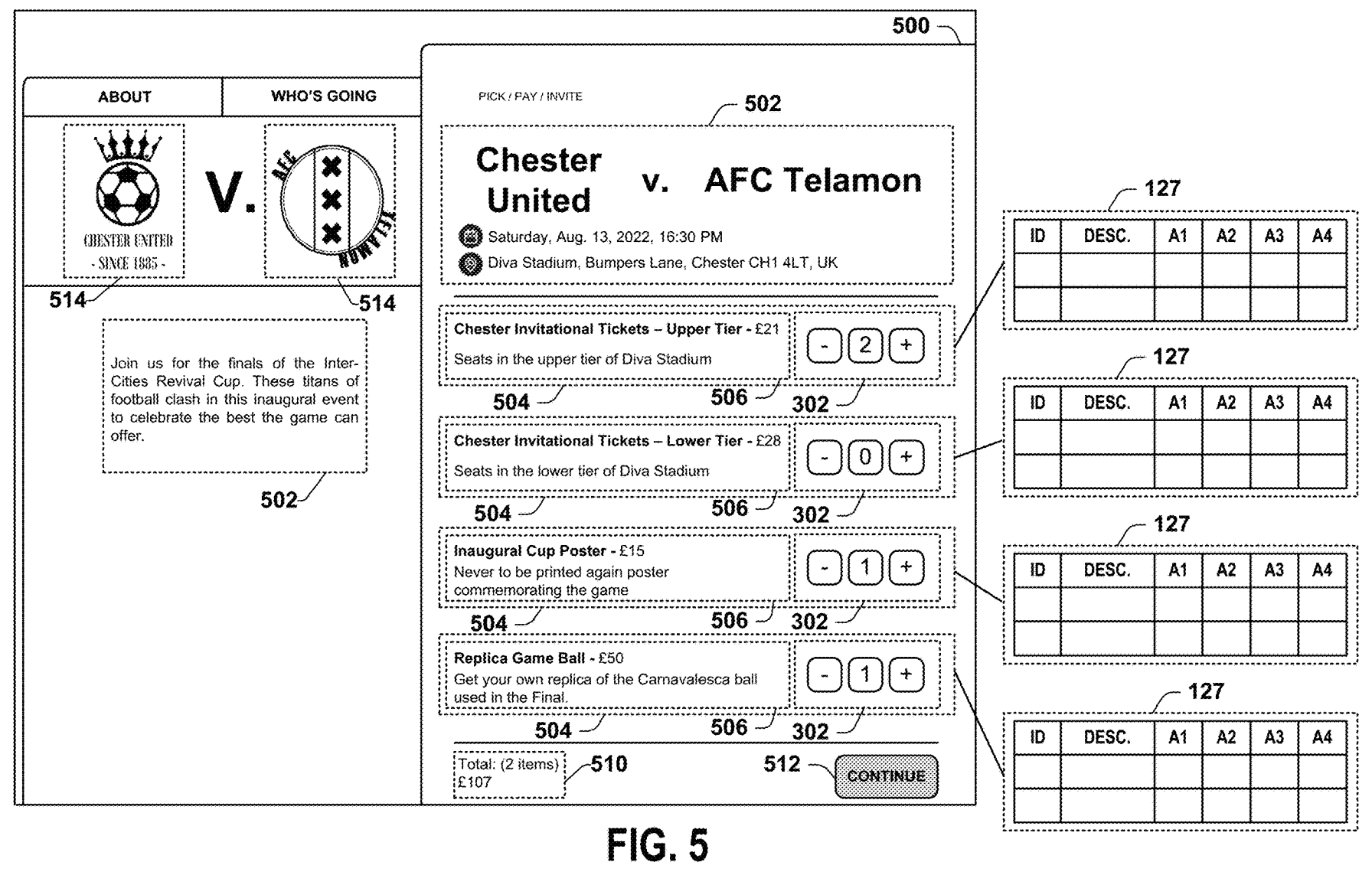

FIG. 5 illustrates an example cart interfaces 500 generated by a browser operating on a computer device 116 in response to being directed to the offer instantiator 118 based on the instantiating script and the offer package 120. In the illustrated example of FIG. 5, the offer instantiator 118 causes the browser to fetch the instantiating script and offer package 120 to instantiate the cart interfaces 500 for a desktop browser. However, in some examples, the offer instantiator 118 may cause the browser to fetch the instantiating script and offer package 120, to instantiate the cart interfaces 500 for a different browser interface (e.g., an interface for a mobile browser, an interface for a smartwatch, an interface for a mixed reality headset, etc.) when the instantiator 118 is accessed by a browser operating on a particular type of device (e.g., a smartphone, a smart watch, a mixed reality headset, etc.). Different interfaces generated by the script may have the same elements 502, 504, 506, 510, 512, and 514 that are rearranged and contextualized, by the script and/or the contents of the offer package 120 to use the browser resources available (such as screen space, input method, processing power, bandwidth availability, etc.). For example, the elements 502, 504, 506, 510, 512, and 514 of the cart interface may be arranged differently in browsers operating on different types of devices to present the same information in a manner that takes into account the limited space on which to display an interface on a mobile device. Once the offer package 120 is loaded in a browser, the instantiating script generates the code and makes the necessary calls to instantiate the cart interface 500 and perform cart management functions without making a backend call. The quantity picker 302 may be different between the cart interfaces 500 instantiated in different types of browsers (or browsers operating on different typed of devices). From time-to-time, the commerce platform 102 may asynchronously update the offer package 120 and/or the instantiating script. In response to the regenerating the offer package 120 and/or the instantiating script, the commerce platform 102 does not generate a signal to the browser to instruct the browser to refresh. The browser updates the cart interfaces 500 in response to an event that causes the browser to re-fetch the offer package 120 and/or the script (e.g., the user instructing the browser to refresh, the commerce platform 102 sending a refresh instruction in response to the user's actions, etc.).

As described in FIGS. 3 and 4 above, the office package 120 includes the inventory slices 127 in the offer package 127 and structures the inventory slices 127 such that the elements of the inventory data objects 125 have corresponding elements 302, 504, and 506 in the cart interface 500. In the illustrated examples, the cart interface 500 includes a high level description 502 of the inventory and an inventory item 504 for each inventory slice 127 in the offer package 127. The high level description 502 provide details that are generally applicable to all of the inventory items 504 (e.g., a title for the offer, a date, time and/or location relevant to the offer, etc.). In the illustrated example, each of the inventory items 504 corresponds to one of the inventory slices 127. While for illustrative purposes, only a limited number of inventory items 504 are shown, the cart interface 500 may include as many inventory items 504 as the inventory slices 127 that are defined in the offer package 120. The inventory item 504 includes a description 506 of the inventory being offered corresponding to the description 314 and/or the attributes 316 from the inventory data object 125.

The inventory slices 127 include inventory items that originate from different inventory data objects 125 received from different merchant networks 104. For example, some inventory slices 127 may include non-fungible or pseudo-fungible inventory items such as sports tickets and some inventory slices 127 may include fungible inventory items, such as clothing or non-limited memorabilia. The inventory slices 127 may define a set of pseudo-fungible goods that, for the purposes of the cart interface 500, are interchangeable. The example inventory slices 127 include multiple rows from the inventory data object 125 (sometimes referred to as a "pool of inventory"), each row representing a unique good or service (e.g., a ticket for a particular seat in a venue, a particular non-fungible token, a particular limited edition item, etc.) that has one or more attributes 316 in common (such as price, region of the venue, target consumer, etc.). As such, each inventory item 504 represents one of these pools of inventory. As the offer package 120 is updated with changes to the inventory slices 127, the script may cause the browser to instantiate more or fewer inventory objects 504 based on the updated inventory slices 127 in the updated offer package 120.

Each of the inventory items 504 is associated with a quantity picker 302 as defined in the offer package 120. When the quantity of items in the quantity picker 302 is changed, the browser, without making a backend call, estimates the total amount based on the information in the offer package 120 and displays the estimated total in a total field 510. Because this calculation is done entirely within the browser: (a) the calculation is quick, and (b) the manipulating of the inventory in the cart interface 500 does not result in traffic being directed to the commerce platform 102 and does not result in any queries into the IMS of the merchant 104. Using the script, based on the offer package 120, this cart management is repeated until the customer interacts with the action button 512. In this manner, the customer may browse the inventory items 504 and add items to the cart without any traffic being directed at the commerce platform 102.

The look and feel of the cart interface 500 is dictated by the selected template brick and the selected theme brick. The template brick dictates how the script, in conjunction with the offer package 120, generates code to define the layout of elements 502, 504, 506, 302, 510, 512, and 514 within the cart interface 500. If, during block 402 of FIG. 4, the merchant were to select a different template brick or the template brick definition changed (e.g., changes that would take effect in block 406 of FIG. 4), when the customer refreshes the browser, the script, in conjunction with the offer package 120, would generate a changed layout. The selected theme brick dictates the aesthetic look and feel (e.g., color, audio visual assets 512, etc.). If, during block 402 of FIG. 4, the merchant were to select a different theme brick or the theme brick definition changed (e.g., changes that would take effect in block 406 of FIG. 4), when the customer refreshes the browser, the script, in conjunction with the offer package 120, would generate a different look and feel of the cart interface 500.

The cart interface 500 is different from the checkout interface. The cart interface 500 does not, until the action button 512 is interacted with, provide a method for the browser, during the course of the user browsing the inventory, to perform backend calls. Thus, in the cart interface 500, selecting and deselecting inventory (e.g., via the quantity picker 302), does not result in network traffic directed towards the commerce platform 102. Additionally, in some examples, actually purchasing the selected inventory cannot be accomplished through the cart interface 500 (e.g., purchasing is gated by proceeding to the checkout interface, etc.). As a result, a large number of users can simultaneously interact with a cart interface 500 instantiated entirely in their own browsers without causing any network traffic to be directed towards the commerce platform 102. The checkout interface facilitates the browser receiving a calculation of actual cost of the selected inventory (via low processing-load backend calls to the commerce platform 102) and initiating purchase of the inventory (via interaction with a checkout button). Until an actual purchase of inventory is initiated (e.g., the user interacting with the checkout button), the checkout interface does not cause any queries into the IMS database 132.

Figure 6A:
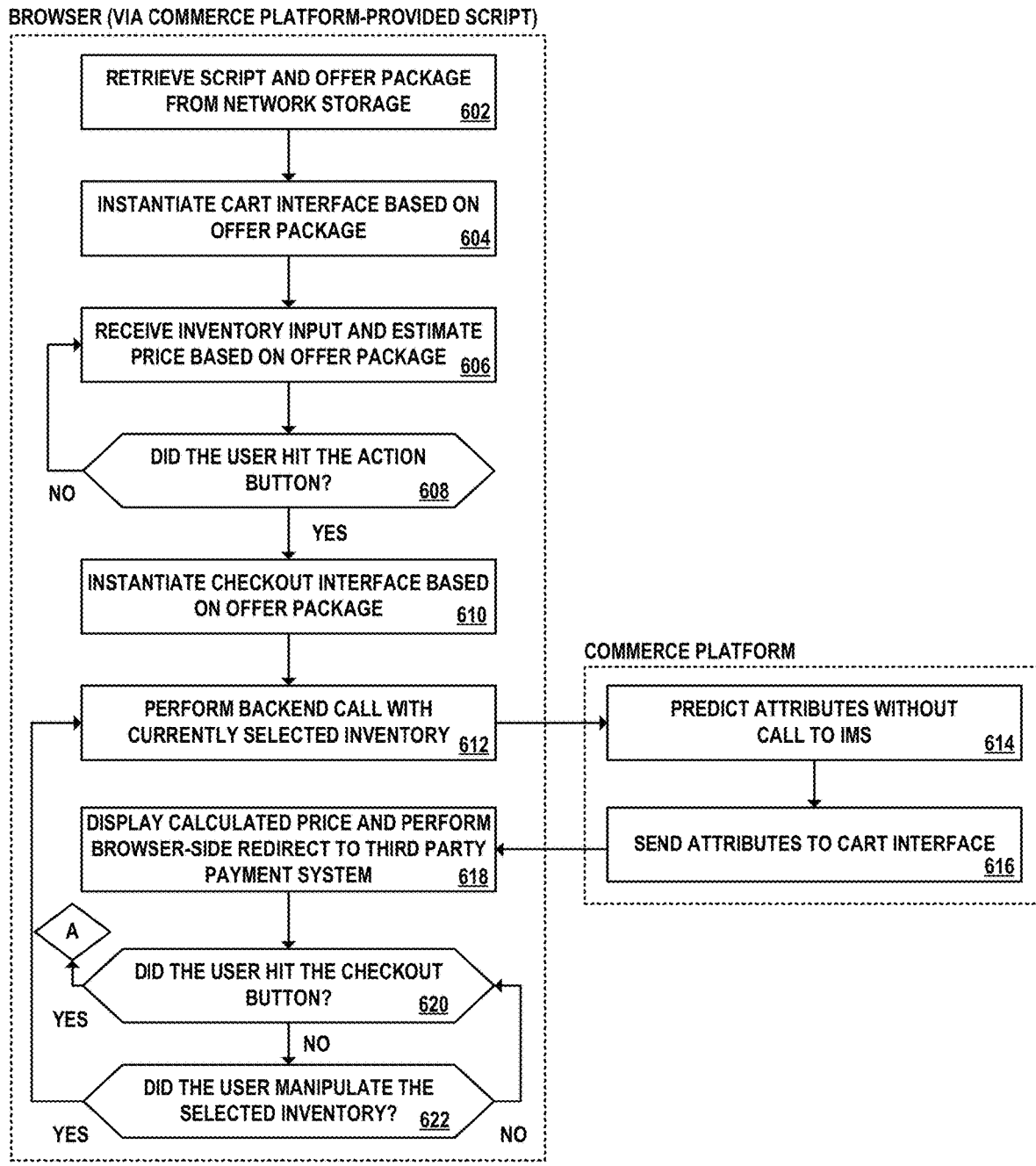
FIGS. 6A and 6B illustrate an example method to provide for a network traffic surge resistant platform, according to the teachings of this disclosure.
Figure 6B:
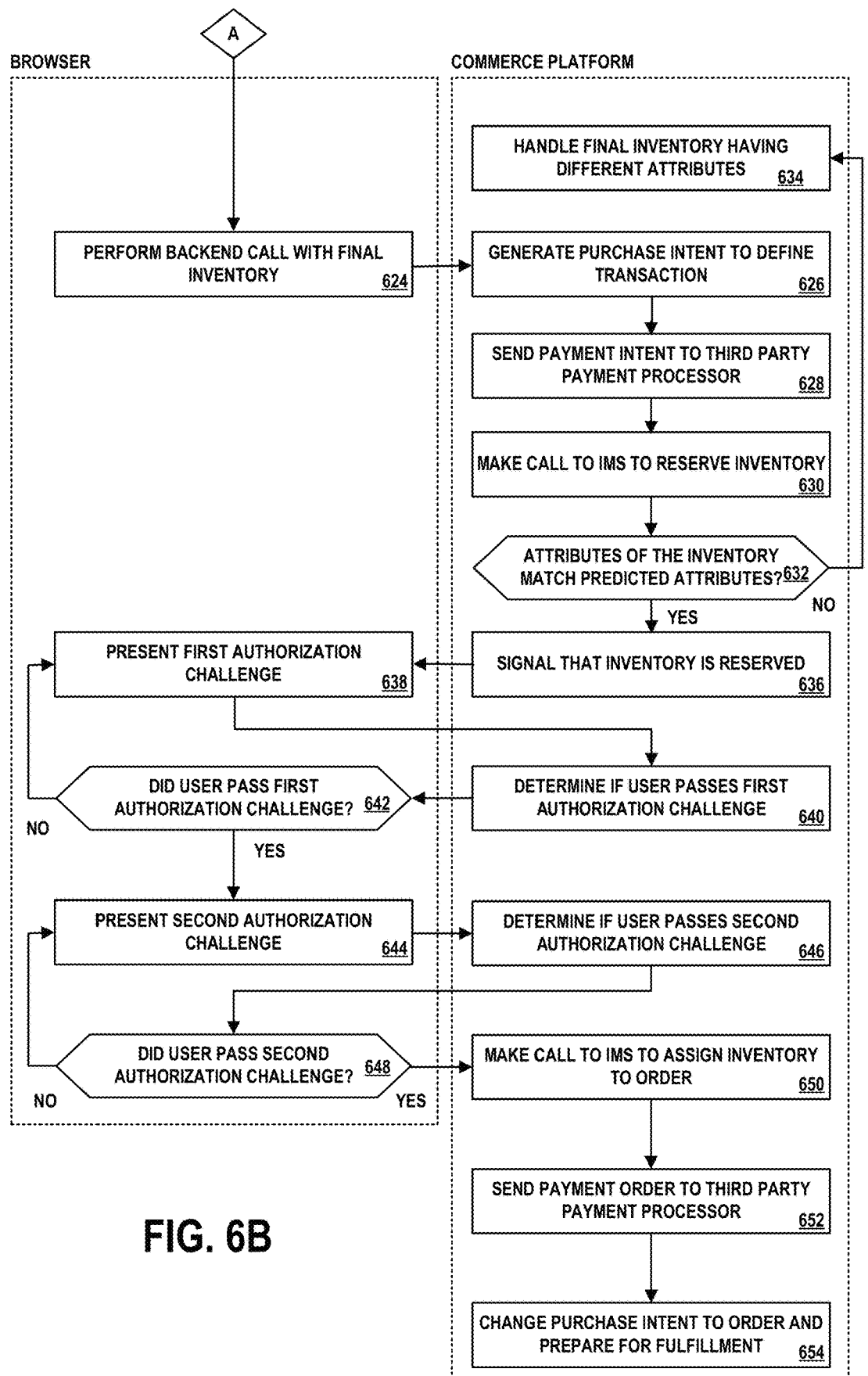

FIGS. 6A and 6B illustrate an example method to provide for a network traffic surge resistant platform. In the illustrated example, the transaction API 122 includes an adaptor 129 that interacts with a merchant network 104 that limits information available until inventory is reserved to, for example, reduce processing load and to reduce bandwidth usage. The method begins when a user loads the offer instantiator 118 into a browser. For example, the user may click on a URL that directs the browser to the location of the offer instantiator 118. Generally, the method minimizes traffic generated towards the commerce platform 102 and queries into the IMS database 132 until the user has demonstrated that greater network traffic and database resource allocation is appropriate. Interface generation (e.g., the cart interface 500 of FIG. 5) and initial cart management are performed by the browser using the processing and memory power of the computing device 116.

Initially, the browser, based on the instructions provided by the offer instantiator 118, retrieves the script and offer package 120 from the network storage 112 in the CDN 114 (block 602). The distributive nature of the network storage 112 in the CDN 114, coupled to the relatively low processing and network intense activity of retrieving the script and offer package 120, means that a network traffic surge is not directed at the commerce platform 102 even when a large number of users load the offer instantiator 118 into their browser in a short period of time. The browser, executing the script, instantiates the cart interface in the browser based on the offer package 120 without making any backend calls to the commerce platform 102 (block 604). The browser receives inventory input (e.g., by manipulation of the quantity picker 508, etc.) and estimates the price of the selected inventory based on the offer package 120 without making any backend calls that result in queries to the IMS (block 606). The estimated price may be displayed in the total field 510 of the cart interface 500A. The browser waits until it receives an inventory input or the user interacts with the action button 512 (block 608). When the browser receives an inventory input ("NO" at block 608), the browser estimates the price of the selected inventory based on the offer package 120 without making any backend calls that result in queries to the IMS (block 606).

When the browser detects that the user interacts with the action button 512 ("YES" at block 608), the browser, using the script, instantiates the checkout interface based on the offer package 120 (block 610). The user may return to the cart interface (e.g., return to block 604) at any point. The browser, based on the script, performs a backend call to the commerce platform 102 that includes the currently selected inventory of the cart interface (block 612).

The commerce platform 102, in response to receiving the backend call, estimates or predicts a price for the currently selected inventory based on the offer package 120 without generating a query to the IMS of the merchant 104 (block 614). In some examples, the corresponding adaptors 129 are queried to provide the prediction or estimate. The prediction is based on attributes and characteristics of the selected inventory and/or stored information previously received from the IMS of the merchant 104. The offer package 120 may include obscured and/or encrypted data that commerce platform 102 is able to unobscure and/or decrypt related to costs beyond the price of the inventory. For example, the commerce platform 102 may calculate the price of the inventory, any fees specified/allowed by the contract (e.g., as specified by the obscured and/or encrypted data) with the merchant 104, and/or taxes to be levied on the purchase. This is a relatively low processing cost calculation. The commerce platform 102 returns the calculated/predicted price to the browser that issued the backend call (block 616). In some examples, the commerce platform 102 may, on copy of the inventory data object 125, track the inventory position as orders are placed. In such examples, the commerce platform 102 may check to determine whether the goods and/or services indicated by the backend call are available without making a call to the IMS. When the goods and services are not available, the commerce platform 102 may, instead of sending a calculated price to the browser, sends an instruction to cause the browser to refresh and retrieve the offer package 120 and to cause the browser to update the cart interface.

The browser, using the instantiator script, displays the calculated price in the checkout interface and performs a browser-side redirect (sometimes referred to as a "client-side redirect") to the third party payment processor(s) 106 to provide the calculated price (block 618). This allows one or more payment interfaces of the third party payment processor(s) 106 to instantiate within the checkout interface and facilitate payment for the selected inventory. This browser-side redirect means that the resources of the browser, not the commerce platform 102, are used to provide the information necessary for the payment interface(s) to instantiate. Thus, if the user does not proceed with checking out, the network resources used by the user towards the commerce platform 102 have been minimal and no IMS database 132 resources have been expended because of the user.

The browser, using the script, determines whether the user interacts with the checkout button (block 620). When the user does not interact with the checkout button ("NO" at block 620), the browser, using the script, determines whether the user manipulated the selected inventory in the checkout interface (block 622). When the user manipulates the selected inventory ("YES" at block 622), the browser, based on the script, performs a backend call to the commerce platform 102 that includes the currently selected inventory of the cart interface (block 612). When the user does not manipulate the selected inventory ("NO" at block 622), the browser determines whether the user interacts with the checkout button (block 620). When the user interacts with the checkout button ("YES" at block 620), the browser, using the script, performs a backend call that includes the selected inventory (block 624 of FIG. 6B).

The commerce platform 102 generates a purchase intent to define the transactions (block 626). The purchase intent is a record of an offer identifier, a browser identifier, an order identifier, a price, and inventory to be purchased, etc. that facilitates tracking an order beginning from the offer instantiator 118 and the offer package 120 to the checkout process such that any transaction can be audited. The purchase intent is linked to the information necessary to verify the content of the transaction.

The commerce platform 102 sends a payment intent to the third party payment processor 106 (block 628). The payment intent may cause the third party payment processor 106 to collect payment information from the user (e.g., via the payment processor widget, etc.) and/or place a hold on funds sufficient to pay the calculated cost. The commerce platform 102 then makes a call to the IMS of the merchant 104 to place a reserve on the selected inventory (block 630). The commerce platform 102 determines whether the predicted attributes of the selected inventory match the actual attributes of the inventory (block 632). For example, the IMS of the merchant network(s) 104 associated with the selected inventory may return the actual attributes of the inventory in response to the call to place a reserve on the selected inventory. These attributes may include, for example, specific item designation (e.g., for non-fungible items), fee or fee group information, available discounts, lot information, shipping origin, expiration or other important dates, availability other than numerically being in stock (e.g., recall, damage, condition or grade, etc.), etc. When the attributes do not match ("NO" at block 632), the commerce platform 102 handles the predicted attributes being different than the actual attributes (block 634). For example, the commerce platform 102 may cancel the transaction. As another example, the commerce platform 102 may send an update to the originating browser to present the selected items with the actual attributes and provide an opportunity for the customer to initiate the transaction with the updated information. As another example, the commerce platform 102 may send an update to the originating browser with substitute suggestions that are substantially similar (e.g., as algorithmically identified) to the selected items and provide an opportunity for the customer to initiate the transaction with the suggested items. While these ameliorative measures may impose a computational cost on the commerce platform 102, when the commerce platform 102 correctly predicts the attributes for a majority of the time, the load on the commerce platform 102 is reduced. Otherwise, when the selected inventory is available ("YES" at block 632), the commerce platform 102 signals to the browser that the inventory is reserved (block 636). The reserve temporarily prevents the entries in the inventory database 132 representative of the inventory from being reserved or otherwise purchased.

The browser, using the script, presents a first authorization challenge (block 638). In some examples, the authorization challenges may be credentials that the user enters where at least one piece of information for the user to enter is a secret (e.g., a user specified password or passcode, an mobile application-based one-time passcode (e.g., a HMAC-based One-time Password algorithm (HOTP) code, a Time-based One-time Password Algorithm (TOTP) code, etc.), a SMS or email-based one-time password (OTP) code, a code provided by a USB or embedded chip based key (sometimes referred to as a "smartcard" or a "security token"), etc.). Upon entry of the answer to the first authorization challenge, via the script, the browser forwards the entry to the commerce platform 102 to determine if the user passes the first authorization challenge.

The commerce platform 102 determines whether the entry provided by the user passes the first authorization challenge and forwards this determination to the browser (block 640). For example, the user may fail the first authorization challenge by entering a mismatched set of credentials, by entering the wrong OTP, and/or waiting too long to enter the OTP. For example, the user may pass the first authorization challenge by entering a matching set of credentials and/or by entering the correct OTP associated with the identifier.

The browser, using the script, determines whether the user passed the first authorization challenge (block 642). When the user does not pass the first authorization challenge ("NO" at block 642), the browser presents a first authorization challenge again (block 644). In some examples, the browser, using the script, may limit the number of times the first authorization challenge may be attempted before, for example, transmitting a message to the commerce platform 102 to end the transaction (e.g., revoking the payment invent and unreserving the inventory, etc.). When the user does pass the first authorization challenge ("YES" at block 642), the browser, using the script, presents a second authorization challenge (block 644). The second authorization challenge requires entry of different secret information than the first authorization challenge that has a different origin than the secret information of the first authorization challenge. For example, the first authorization challenge may be entry of an OTP received from a SMS message and the second authorization challenge may be entry of a different OTP receive from an email. In some examples, the authorization challenges may be structured such that they may be performed without the user having an account or prior relationship with the commerce platform 102. In some examples, the first authorization challenge may require entry on a mobile phone number to which the commerce platform 102 sends a first OTP, and the second authorization challenge may require entry of an email address to which the commerce platform 102 sends a second OTP. In such examples, these credentials (e.g., the mobile number and email address) may be associated with the purchase intent such that future fulfillment requires entry of the same mobile number-email address pair (e.g., in response to subsequent authorization challenges at the time of fulfillment, etc.). Although two authorization challenges are described herein, there may be fewer (e.g., one) or more (e.g., three or more) authorization challenges. Upon entry of the answer to the second authorization challenge, via the script, the browser forwards the entry to the commerce platform 102 to determine if the user passes the first authorization challenge.

The commerce platform 102 determines whether the entry provided by the user passes the second authorization challenge and forwards this determination to the browser (block 644). For example, the user may fail the second authorization challenge by entering a mismatched set of credentials, by entering the wrong OTP, and/or waiting too long to enter the OTP. For example, the user may pass the second authorization challenge by entering a matching set of credentials and/or by entering the correct OTP associated with the identifier.

The browser, using the script, determines whether the user passed the second authorization challenge (block 648). When the user does not pass the second authorization challenge ("NO" at block 648), the browser presents a second authorization challenge again (block 644). In some examples, the browser, using the script, may limit the number of times the second authorization challenge may be attempted before, for example, transmitting a message to the commerce platform 102 to end the transaction (e.g., revoking the payment invent and unreserving the inventory, etc.). When the user passes the second authorization challenge ("YES" at block 648), the commerce platform 102 makes a call to the IMS of the merchant 104 to the selected inventory to be fulfilled (block 650). The commerce platform 102 sends a payment order to the third party payment processor (block 652). The payment order causes the third party payment processor to charge the customer based on the payment intent. The commerce platform changes the purchase intent to a purchase order and prepares for fulfillment (e.g., perform post fulfillment tasks, such as gathering shipping information, etc.) (block 654).

Figure 7:
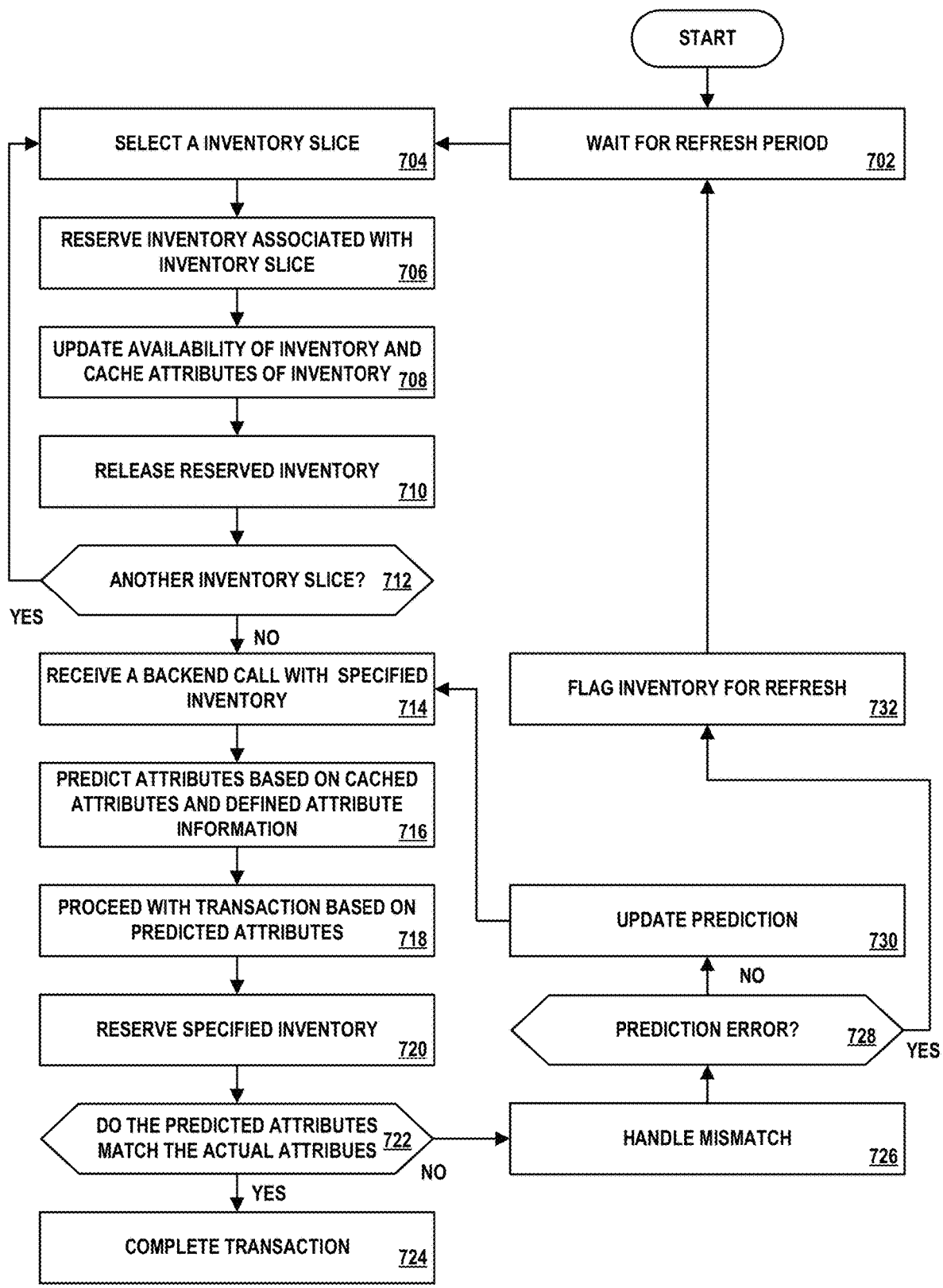
FIG. 7 is a flowchart of an example method for an adaptor to handle an inventory management system that employs limited information sharing, according to the teachings of this disclosure.

FIG. 7 is a flowchart of an example method for an adaptor 129 to handle an IMS of a merchant network 104 with limited information sharing. For example, the merchant network 104 may limit information regarding attributes of an inventory item until a certain stage in an order such that computation and bandwidth usage is lessened until necessary to complete an order. Initially, the adaptor 129 waits for a refresh period (block 702). A refresh period is a time at which the usage of the inventory database 132 is relatively low. This period may be manually initiated, predetermined (e.g., for a time, such as 2:00 AM, that is traditionally a period of low use), and/or automatically detected (e.g., detecting when the commerce platform 102 is not making requests to the merchant network 104, etc.).

The adaptor 129 selects an inventory slice 127 with inventory items that are associated with the merchant network 104 (block 704). The adaptor 129 makes a call to the IMS of the merchant network 104 to reserve at least one item of the selected inventory slice 127 (block 706). In some examples, the adaptor 129 reserves all of the items of the selected inventory slice 127. In some examples, the adaptor 129 reserves a representative sample of the items of the selected inventory slice 127. For example, the representative sample may be inventory items that cover that variations of attributes 316 (e.g., the non-in-common attributes) within the inventory slice 127. The adaptor 129 updates the availability of the inventory items (e.g., on an internal ledger) and/or stores attributes of the inventory items, such as price, fees, condition, and/or serial or lot number, etc. (block 708). The adaptor 129 then makes a call to the IMS of the merchant network 104 to release the reserved inventory (block 710). The adaptor 129 determines if there is another inventory slice 127 to update (block 712). For example, the adaptor 129 may be updating inventory slices 127 where the adaptor 129 has previously detected a mismatch between actual attributes and predicted attributes. As another example, the adaptor 129 may be updating all of the inventory slices 127 associated with the merchant network 104. When adaptor 129 determines there is another inventory slice 127 to update ("YES" at block 712), then adaptor 129 selects an inventory slice 127 with inventory items that are associated with the merchant network 104 (block 704).

When adaptor 129 determines there is not another inventory slice 127 to update ("NO" at block 712), the adaptor 129 waits until it receives a backend call with specified inventory (e.g., at block 614 of FIG. 6A above) (block 714). The adaptor 129 predicts the attributes of the selected inventory items based on the stored attributes (block 716). For example, the adaptor 129 may predict the fees associated with the selected inventory items to be able to provide a non-estimated cost to the cart interface instantiated in the browser. The commerce platform proceeds with the transaction (e.g., at block 618 of FIG. 6A) (block 718). During the transaction, the commerce platform 102 (e.g., via the adaptor 129) makes a call to the IMS of the merchant network 104 to reserve the inventory items (e.g., at block 630 of FIG. 6B) (block 718). During the reservation process, the adaptor 129 receives or otherwise retrieves the actual attributes for the inventory item(s). The adaptor 129 determines whether actual attributes match the predicted attributes (block 722). When the actual attributes match the predicted attributes ("YES" at block 722), the commerce platform 102 proceeds with the order (e.g., at block 636 of FIG. 6B) (block 724).

When the actual attributes do not match the predicted attributes ("NO" at block 722), the commerce platform 102 handles the mismatch (block 726). For example, the commerce platform 102 may cancel the transaction. As another example, the commerce platform 102 may send an update to the originating browser to present the selected items with the actual attributes and provide an opportunity for the customer to initiate the transaction with the updated information. As another example, the commerce platform 102 may send an update to the originating browser with substitute suggestions that are substantially similar (e.g., as algorithmically identified) to the selected items and provide an opportunity for the customer to initiate the transaction with the suggested items. The adaptor 129 determines whether the mismatch was due to a prediction error (block 728). For example, the adaptor 129 may determine it is a prediction error when a number of errors is above a threshold. For example, if the prediction is consistently wrong and updating does not correct the error, then the adaptor may determine it is a prediction error. If it is not a prediction error ("NO" at block 728), the adaptor 129 updates the prediction of the inventory item and similar inventory items (block 730). If it is a prediction error ("NO" at block 728), the adaptor 129 flags the inventory for a refresh (block 732). The adaptor 129 then waits for the refresh period (block 702).

Although the embodiments of the present invention have been illustrated in the accompanying drawings and described in the foregoing detailed description, it is to be understood that the present disclosure is not to be limited to just the embodiments disclosed, but that the disclosure described herein is capable of numerous rearrangements, modifications and substitutions without departing from the scope of the claims hereafter. The terms "includes," "including," and "include" are inclusive and have the same scope as "comprises," "comprising," and "comprise." respectively. The claims as follows are intended to include all modifications and alterations insofar as they come within the scope of the claims or the equivalent thereof.

Having thus described the invention, the following is claimed:

1. A network traffic surge resistant system comprising:
   network storage; and
   one or more servers configured as a commerce platform configured to:
   operate an adaptor between the commerce platform and an inventory management system, the adaptor configured to protect the inventory management system from transactions generated by a surge of network traffic directed at the commerce platform;
   generate a script, an offer package, and an offer instantiator based on inventory information received by the adaptor;
   store the script and the offer package onto the network storage, the offer instantiator providing the location of the script and the offer package in the network storage;
   wherein, in response to a browser operating on a computing device accessing the offer instantiator:
   causing, by the offer instantiator, the browser to retrieve the script and the offer package from the network storage;

causing, by the script, the browser to instantiate a cart interface within the browser based on the offer package using the resources of the computing device without making a backend call to the commerce platform, the cart interface including an action button; and causing, by the script, the browser to perform cart management functions without making a backend call to the commerce platform until detecting an interaction with the action button.

2. The system of claim 1, in response to the interaction with the action button, causing, by the script, the browser to:
send the backend call to the commerce platform, the adaptor to predict attributes of the selected inventory included in the backend call, and
instantiate, in the browser using the resources of the computing device, a checkout interface based on the offer package and a response to the backend call, the response including the predicted attributes.

3. The system of claim 2, wherein the response includes the predicted attributes to be presented in the checkout interface.

4. The system of claim 2, wherein the backend call includes an identity and quantity of a good or service currently present in the cart interface to be purchased, and wherein in response to receiving the backend call, the commerce platform is to predict attributes of the good or service and return a total price for the good or service based on the prediction without making a call to the inventory management system.

5. The system of claim 2, wherein the checkout interface includes one or more checkout buttons and wherein, in response to detecting an interaction with one of the checkout buttons, causing the browser, by the script, to send a second backend call to the commerce platform including an identity and quantity of a good or service currently present in the checkout interface to be purchased.

6. The system of claim 2, wherein, in response to receiving the second backend call, the commerce platform is configured to:
make a call, via the adaptor, to the inventory management system to reserve the good or service identified in the second backend call;
receive current attributes of the good or service identified in the second backend call from the inventory management system; and
compare the current attributes of the good or service identified in the second backend call to the predicted attributes.

7. The system of claim 6, wherein when the current attributes do not match the predicted attributes, send, by the commerce platform, a second response to the browser to cause the browser to present the current attributes to the user.

8. The system of claim 6, wherein when the current attributes do not match the predicted attributes, set, by the commerce platform, a flag to cause the adaptor to store attributes of the inventory received as a result of reserving the inventory during a refresh period.

9. The system of claim 1, wherein the adaptor is configured to, during a refresh period:
reserve inventory in the inventory management system;
store attributes of the inventory received as a result of reserving the inventory; and
release the inventory in the inventory management system.

10. The system of claim 9, wherein the refresh period is determined by the adaptor based on a frequency of transactions directed at the inventory management system.

11. A method to provide a network traffic surge resistant platform that protects an inventory management system, the method comprising:
operating, by the platform, an adaptor between the platform and the inventory management system, the adaptor configured to protect the inventory management system from transactions generated by a surge of network traffic directed at platform;
generating, by the platform, a script, an offer package, and an offer instantiator based on inventory information received by the adaptor and storing the script and the offer package onto the network storage, the offer instantiator providing the location of the script and the offer package in the network storage;
retrieving, by a browser operating on a computing device at the direction of the offer instantiator, the script and the offer package from the network storage;
instantiating, by the script executing in the browser, a cart interface within the browser based on the offer package using the resources of the computing device without making a backend call to the commerce platform, the cart interface including an action button; and
performing, by the script executing in the browser, cart management functions without making a backend call to the commerce platform until detecting an interaction with the action button.

12. The method of claim 11, in response to the interaction with the action button, by the script executing in the browser:
sending, by the script executing in the browser, the backend call to the commerce platform;
predicting, by the adaptor, predicted attributes of the selected inventory included in the backend call, and
instantiating, by the script executing in the browser, a checkout interface based on the offer package and a response to the backend call, the response including the predicted attributes.

13. The method of claim 12, wherein the response includes the predicted attributes to be presented in the checkout interface.

14. The method of claim 12, wherein the backend call includes an identity and quantity of a good or service currently present in the cart interface to be purchased, and wherein in response to receiving the backend call, predicting, by the adaptor, predicated attributes of the good or service and return a total price for the good or service based on the predicated attributes making a call to the inventory management system.

15. The method of claim 12, wherein the checkout interface includes one or more checkout buttons and wherein, in response to detecting an interaction with one of the checkout buttons, sending, by the script executing in the browser, a second backend call to the commerce platform including an identity and quantity of a good or service currently present in the checkout interface to be purchased.

16. The method of claim 12, wherein, in response to receiving the second backend call:
making a call, by the adaptor, to the inventory management system to reserve the good or service identified in the second backend call;
receiving, by the adaptor, current attributes of the good or service identified in the second backend call from the inventory management system; and comparing, by the adaptor, the current attributes of the good or service identified in the second backend call to the predicted attributes.

17. The method of claim 16, wherein when the current attributes do not match the predicted attributes, sending, by the commerce platform, a second response to the browser to cause the browser to present the current attributes to the user.

18. The method of claim 16, wherein when the current attributes do not match the predicted attributes, setting, by the commerce platform, a flag to cause the adaptor to store attributes of the inventory received as a result of reserving the inventory during a refresh period.

19. The method of claim 11, further comprising, by the adaptor, during a refresh period:
   reserving inventory in the inventory management system;
   storing attributes of the inventory received as a result of reserving the inventory; and
   releasing the inventory in the inventory management system.

20. The method of claim 19, wherein the refresh period is determined by the adaptor based on a frequency of transactions directed at the inventory management system.

* * * * *